Aug. 1, 1967  D. F. WINNEK  3,334,179
STEREOSCOPIC TELEVISION
Filed June 4, 1963  7 Sheets-Sheet 4
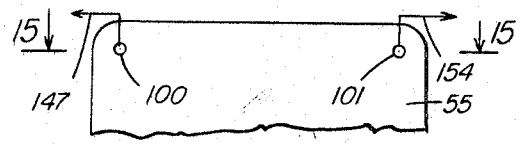
FIG. 8
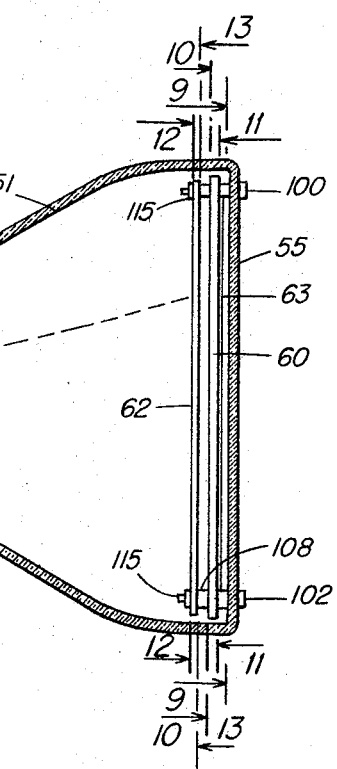
FIG. 7
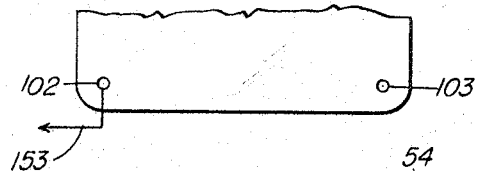
FIG. 9
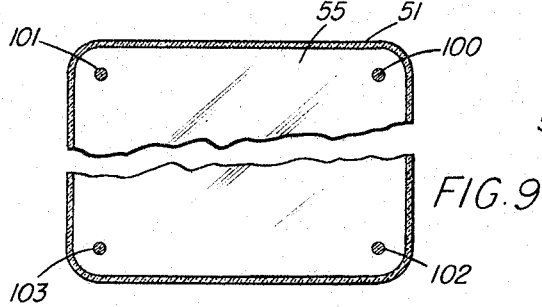
FIG. 10
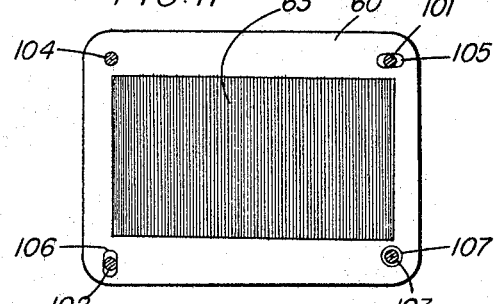
FIG. 11
FIG. 13
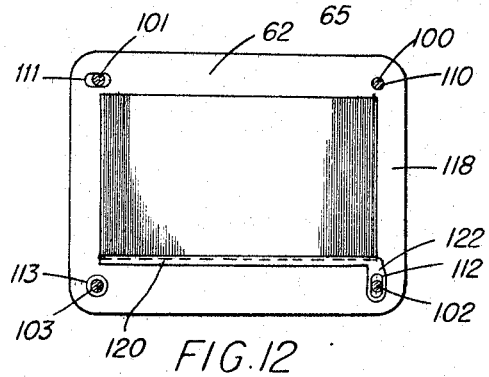
FIG. 12
INVENTOR.
Douglas F. Winnek
BY Robert S. Dunham
Attorney Aug. 1, 1967 D. F. WINNEK 3,334,179
STEREOSCOPIC TELEVISION
Filed June 4, 1963 7 Sheets-Sheet 5
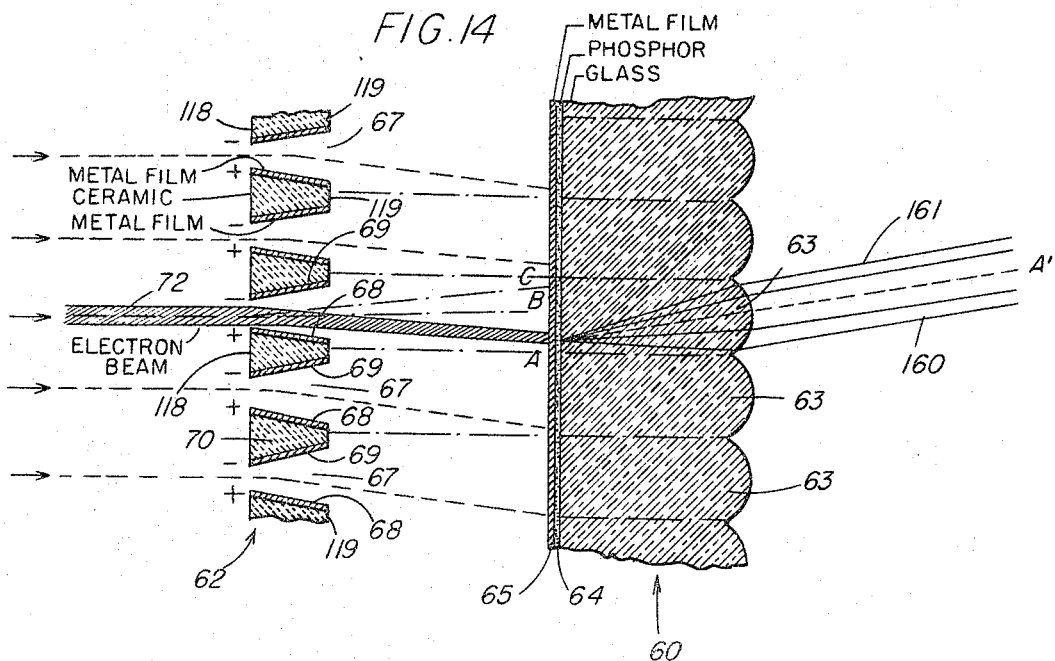
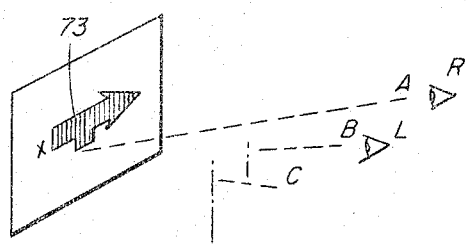
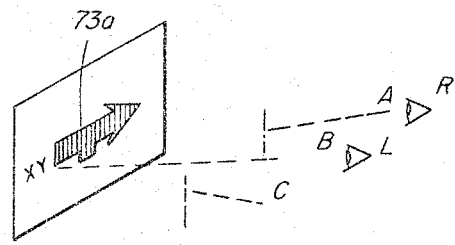
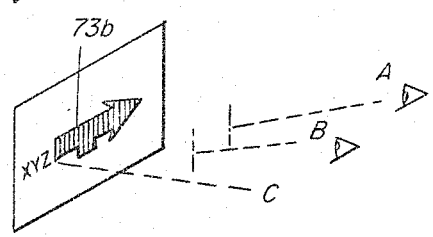
INVENTOR.
Douglas F. Winnek
BY
Robert S. Dunham
Attorney INVENTOR.
Douglas F. Winnek
BY
Robert S. Dunham
Attorney Aug. 1, 1967　　　D. F. WINNEK　　　3,334,179
STEREOSCOPIC TELEVISION
Filed June 4, 1963　　　　　　　　　　　　7 Sheets-Sheet 7

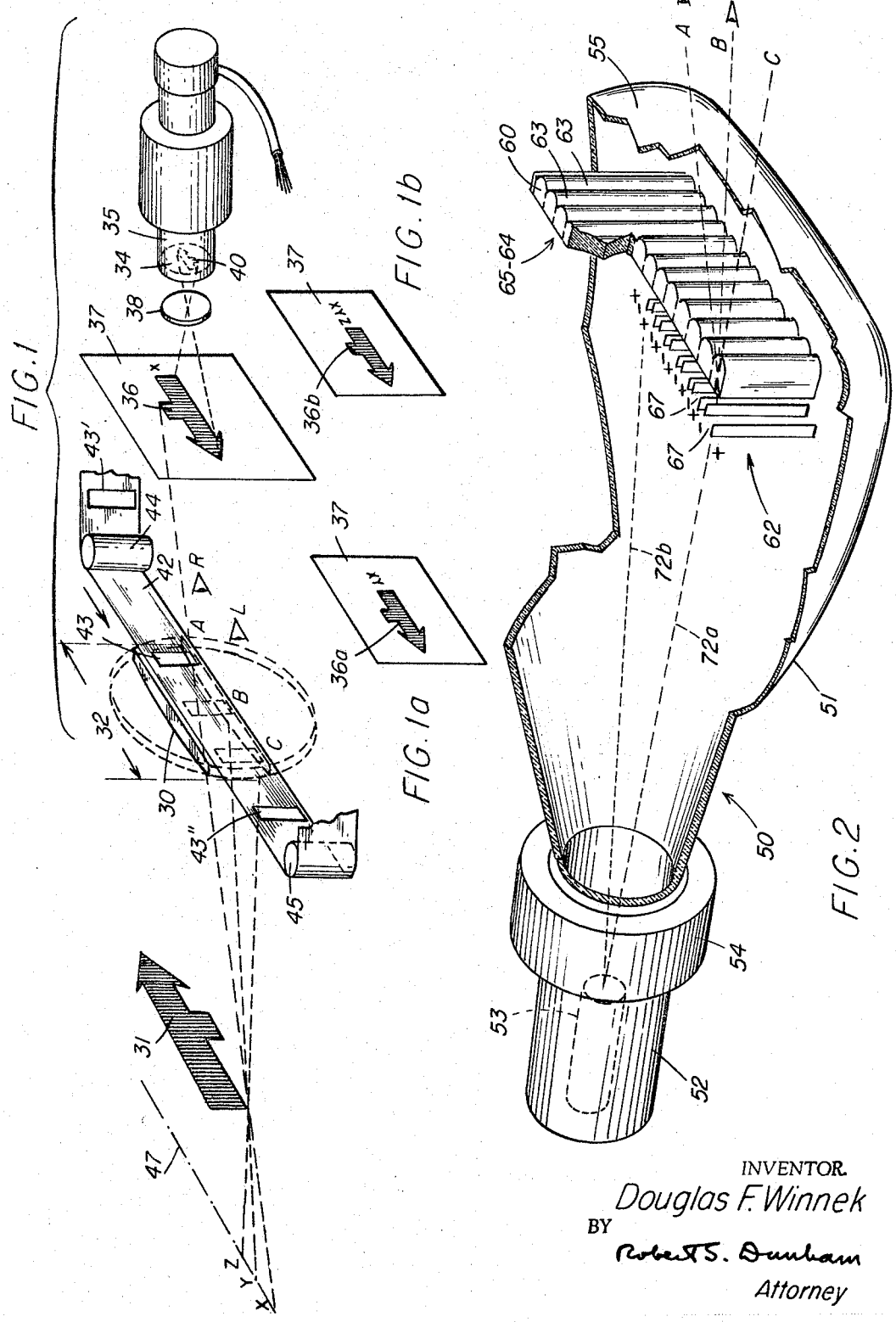

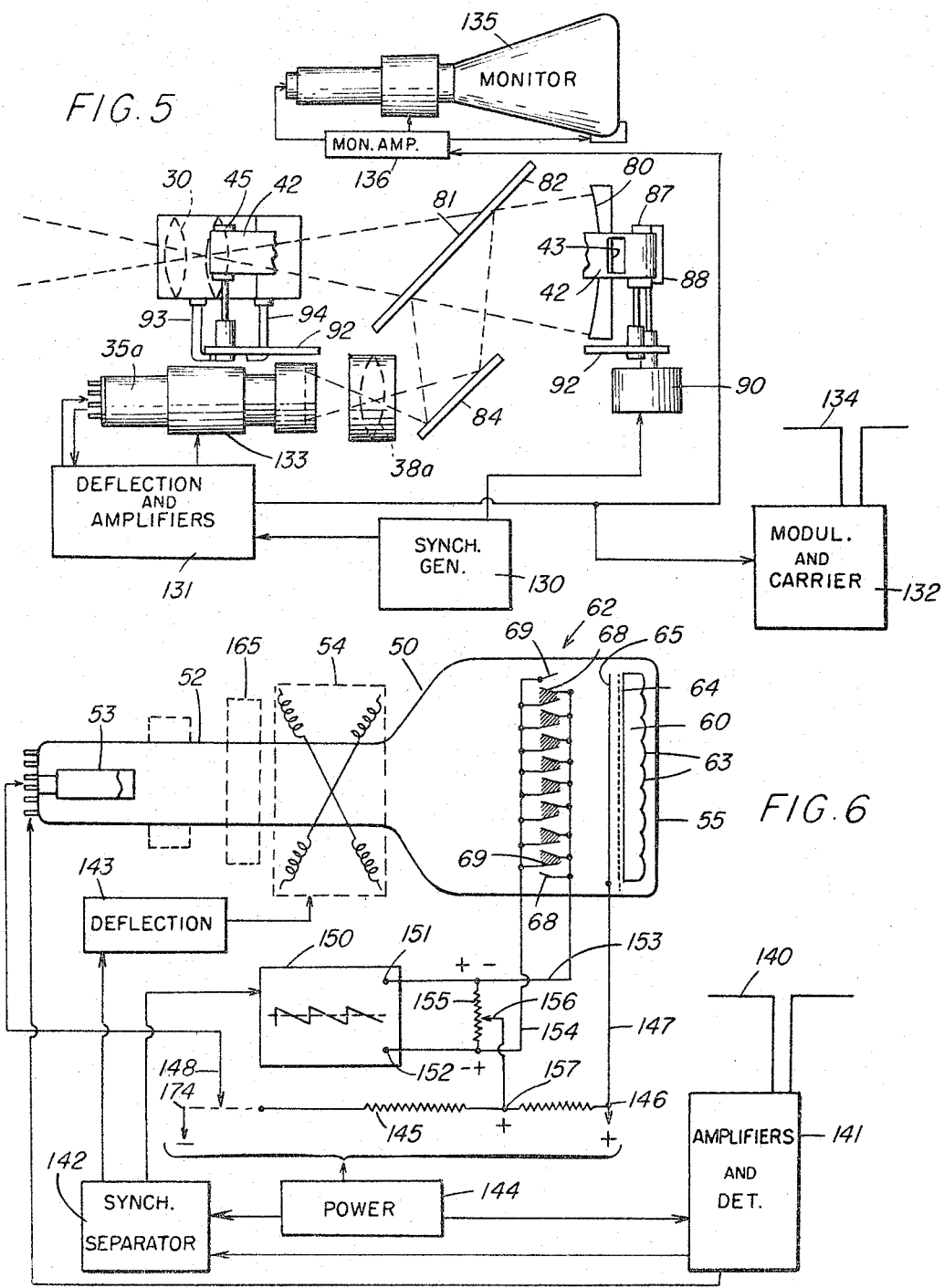

INVENTOR.
Douglas F. Winnek
BY Robert S. Dunham
Attorney

United States Patent Office 3,334,179
Patented Aug. 1, 1967

3,334,179
STEREOSCOPIC TELEVISION
Douglas F. Winnek, Los Altos, Calif., assignor to Winnek
Television Systems, Inc., Palo Alto, Calif.
Filed June 4, 1963, Ser. No. 285,432
20 Claims. (Cl. 178—6.5)

This invention relates to stereoscopic television and particularly to methods and apparatus for viewing and reproducing scenes by television in such manner as to provide effective stereoscopic characteristics, i.e. so that the image at the receiver is seen in a three-dimensional or relief picture.

In these respects, the invention is concerned with novel methods and camera apparatus for stereoscopically televising an object or scene, i.e. for producing signals appropriately translatable to afford stereoscopic reproduction. The invention is further concerned with novel methods and apparatus, including a new and effective picture tube, whereby suitable signals are converted into a stereoscopic television picture, preferably one that can be viewed directly by a person observing the screen, to yield a full stereoscopic or three-dimensional presentation. In other and more comprehensive respects, the invention is directed to new procedural combinations and systems, embracing the cooperative relation of the camera and reproducing means, whereby the described results of stereoscopic television are achieved in an improved and unusually satisfactory manner.

A particular object is to afford methods and apparatus of the character stated, which are specially adapted for use with present television equipment and techniques, and are unusually effective and reliable for the purpose of stereoscopic viewing and reproduction, yet are not unduly expensive or characterized by undesirable complexity of structure or function.

A notably important object is the provision of novel and improved operations and instrumentalities whereby the ultimately observed picture yields a stereoscopic effect that is continuously exhibited over a considerable range of viewing angles, for instance as has been satisfactorily attained with photographs or other still pictures where so-called wide-lens or scanning techniques have been utilized in photographing the object and where lenticular or equivalent screens are employed for resolving the ultimately observed image or imprint into aspect elements individually seen by the eyes of the observer. The basic nature of stereoscopic reproduction of the sort just mentioned is described in my U.S. Patent No. 2,562,077, granted July 24, 1951, for Composite Stereography, to which reference is therefore made for an understanding of this kind of stereoscopic reproduction and for an understanding of certain terminology that may be employed herein.

While a three-dimensional effect can be obtained with a system or scheme that simply involves a single right-eye view and a single left-eye view, such systems are of limited practical value, especially if designed to dispense with local viewing devices that the observer must hold next to his eyes. In particular, a viewer can only see the picture properly from essentially one position relative to the optical axis of the picture (e.g. a line perpendicular to its surface). Furthermore, the exhibited view lacks any effect of motion or displacement, which is a minor but significant part of a three-dimensional effect that is achieved with normal binocular vision. That is to say, in looking at a natural scene, the perception of depth is aided by movements of the viewer, which produce corresponding relative displacement of objects at different distances, which contribute to their positional identification. In preferred embodiments of the present invention, the stereoscopic presentation is of a so-called laterally continuous type, in that within a convenient range, the observer may move somewhat from side-to-side, i.e. looking from successively different angles, and yet retain a full stereoscopic view and perceive relative displacement of near and far objects in the observed scene. Although the methods and systems herein described may have application in the limited provision of simple two-element viewing, and indeed afford considerable improvement in such cases, a highly significant feature of the invention is related to the more complete type of composite stereoscopic presentation explained above.

A composite stereograph of the multiple aspect type essentially consists of a lenticular or other component-resolving screen behind which the viewed picture is divided into image components corresponding to the elements of the screen, each component being in effect constituted by a multiplicity of "aspect elements" representing minute elements of the depicted object as viewed from respectively different aspects or angles. Thus for example, the screen may be a transparent film or plate provided with a multitude of parallel, contiguous vertical ridges facing outwardly and each having the characteristics of a cylindrical lens, i.e. a surface curved about a vertical axis. Hence the observer's eye looking at such a screen from a given angle sees in effect only a very narrow area at the rear face of the screen, and as the area of observation is changed, different narrow, linear regions behind the respective lenticulations, come into view. As will now be understood, the image or imprint applied to the rear face of the screen is thus designed to provide a multiplicity of fine, parallel aspect elements, extending vertically in alignment with the axes of the lenticulations, and such as to constitute respectively the elements of a viewed object or scene as perceived from a corresponding multiplicity of different angles or aspects. Very preferably, the establishment of the desired image is achieved by originally viewing the object from a corresponding multiplicity of angles, i.e. over a lateral distance substantially greater than the so-called normal pupillary distance, which is, for example, the average distance of about two and one-half inches between the eyes of an observer. With the scene viewed from a multitude of angles, so as in effect to afford a corresponding multitude of images from the different aspects, and with the picture behind the viewing scene considered as divided into image components respectively corresponding to the lenticulations of the screen, each component must consist of a multiplicity of aspect elements arranged side-by-side in the space behind each lenticulation. The order of these minute strip-like aspect elements being appropriately established, in correspondence with the order of original viewing of the object from successively adjacent angles, an observer looking at the lenticular screen sees appropriately different aspects with his right and left eyes, and indeed sees different pairs of such aspects from different points of observation relative to the screen. Thus the stereoscopic effect is achieved over a corresponding range of positions.

As indicated above, a particular feature of the present invention is the provision of such reproduction by television. To that end, a presently preferred embodiment of the invention involves camera apparatus having an objective lens or equivalent optical means of relatively wide aperture (e.g. equal to more than one pupillary distance and advantageously equal to at least several such distances), together with timed means for projecting an image through said lens at successive, restricted areas thereof, considered horizontally crosswise of such lens. The thus imaged view is directed, through such further optical operations as desired, to the image-receiving plate or surface of an appropriate television camera tube, such as an iconoscope, image orthicon, Vidicon, or the like.

Means for traversing the main lens for the described, laterally-restricted area of view may comprise mechanical stop or shutter means, arranged for cyclically scanning an appropriate region across the lens, as at or near the nodal plane thereof. An effective embodiment of such means is a continuous, opaque ribbon or tape having a vertical slot, and moved in a continuous or other cyclical manner so that the lens is continuously swept or traversed by the opening. Thus successive frames or half-frames of electronic scanning as achieved in the camera tube, and being successive frames of the image for transmission as television signals, are in effect images corresponding to views of the televised object from a sequence of aspects.

The travel of the apertured means is appropriately effected at a controlled speed or frequency, e.g. conveniently in accordance with other synchronized elements of the television system and operation, so that the resulting transmission involves video signals of conventional character, with provision, which may be simply the normal synchronizing pulses or special pulses, whereby a cyclic operation corresponding to the described lens traversal may be achieved at the receiving locality.

Essential aspects of preferred receiving apparatus according to the invention include a picture tube and associated circuitry for establishing a stereoscopically viewable image in response to the transmitted signals. In particular, the tube includes a lenticular or other component-resolving screen, together with a suitable phosphor surface rearwardly of such screen, and means for indexing or similarly controlling the scanning electron beam so that aspect elements corresponding to the respective aspect views of the transmitting camera are established at appropriate vertical localities behind the lenticular screen. In accordance with a special feature of the invention, the last-mentioned means may comprise a special grid or like structure, near the phosphor surface or coating, whereby the scanning beam is specifically deflected in a cyclic manner timed with the cyclic operation of the traveling aperture at the remote camera station whereby successive frames or half-frames, as painted by the beam, are in effect finely divided into aspect elements.

Such grid or the like may comprise a multiplicity of parallel, conductive parts, surfaces or wires, so arranged as to constitute lateral boundaries of regions that are horizontally coextensive with the width of the individual lenticulations of the screen. Means are also provided whereby a changing potential is applied across each pair of such grid elements, in synchronism with the aperture traversal at the pick-up or transmitting station whereby successive frames of picture reproduction are in effect constituted by successive aspect elements in the phosphor area. That is to say, each frame may be deemed to be composed of the sum of a multiplicity of aspect elements, one for each lenticulation, while the aspect elements for successive frames are situated at correspondingly successive positions across the image element space in the phosphor by reason of the special deflection in the grid.

As indicated, the nature and frequency of the deflection is governed in synchronism with the apertured-ribbon traversal in the camera, e.g. by appropriate synchronizing means under the control of the proper pulses in the transmitted signals. Hence a sequence of pictures are reproduced, respectively viewable from different angles of observation of the viewing screen, and corresponding to different aspects across the wide field of view at the transmitting camera. With suitably synchronized cyclical operation, as described, the viewer sees repeated, selected aspects of appropriate character with his respective eyes, so desired stereoscopic effect is achieved, indeed for any of a variety of positions which the viewer may adopt. As will now be understood, the frame frequency or half-frame frequency of the system should be such, in coordination with the traversal frequency of aspect sequence, as to afford the requisite persistence of vision and continuity of motion for the viewer or observer. It has been found that such results are obtainable, in a useful manner, even within the present standard frame frequency of television broadcasting, although other frame frequencies, e.g. of higher order, may be utilized to great advantage. By the same token, for specialized purposes, as by accepting some lesser utility of persistence of continuity in favor of greater definition or resolution or of wider range of aspect angles, a particular selection of traversal frequency may be adopted in many cases, i.e. different from a value more suitable for general viewing.

The procedure and system of the invention, while useful for television of ordinary entertainment and educational character, has special advantages in a variety of fields where stereoscopic representation is particularly significant. Some instances are medical, military and industrial applications, as where it is desired to transmit views of surgical procedures, physiological examinations, industrial plant operations, field inspection of engineering projects, and military and like observation, the system for such purposes being readily adaptable to both remotely transmitted and closed circuit types of equipment.

As will further be apparent hereinbelow, a special advantage of the present improvements is that the scanning raster in the receiving tube need not be precisely correlated with individual elements of the lenticular or like screen. Were it attempted to impose different aspect elements along each trace of the electron beam, it would be correspondingly necessary to control the trace so that the aspect elements representative of one aspect view would appear at the same position behind each and every lenticulation of the screen. Such control requires extremely precise linearity of the beam trace, and indeed of all of the successive traces from top to bottom of the raster, with equally precise control of the position of the raster as a whole, in a lateral sense relative to the lenticulations. With the sequential depiction of aspect views, i.e. sequential in time, as provided in the present invention, and with the coordinated deflection of the beam relative to the viewing angle of the aspect views in the camera, the proper positioning of aspect elements is accomplished in a ready and precise manner, being governed by the stated synchronism of picture tube beam deflection with camera aperture traversal.

These and further advantages of the invention, and likewise additional features of the latter and details of construction and operation, will be apparent from the following description and accompanying drawings of certain embodiments.

Referring to the drawings:

FIG. 1 is a simplified schematic view of a television camera system embodying the invention, including a representation of one aspect view of an object being televised;

FIGS. 1a and 1b respectively show, in the manner of a part of FIG. 1, two other aspect views of the object;

FIG. 2 is a simplified, perspective view, with parts broken away, of a picture tube embodying the invention;

FIG. 5 is a schematic side elevation of the camera of FIGS. 3 and 4, together with diagrammatic illustration of accompanying portions of a transmitting system;

FIG. 6 is a diagram of a receiving system, including a picture tube of the character shown in FIG. 2;

FIG. 7 is a central, lengthwise, vertical section, with some parts (including a grid and screen assembly) viewed in elevation, and with some further detail, of a picture tube as indicated in FIGS. 2 and 6;

FIG. 8 is a fragmentary elevational view of the right-hand end of FIG. 7, showing the outer face of the tube;

FIG. 9 is a vertical section on line 9—9 of FIG. 7, showing the inner surface of the end face of the tube;

Figure 4:
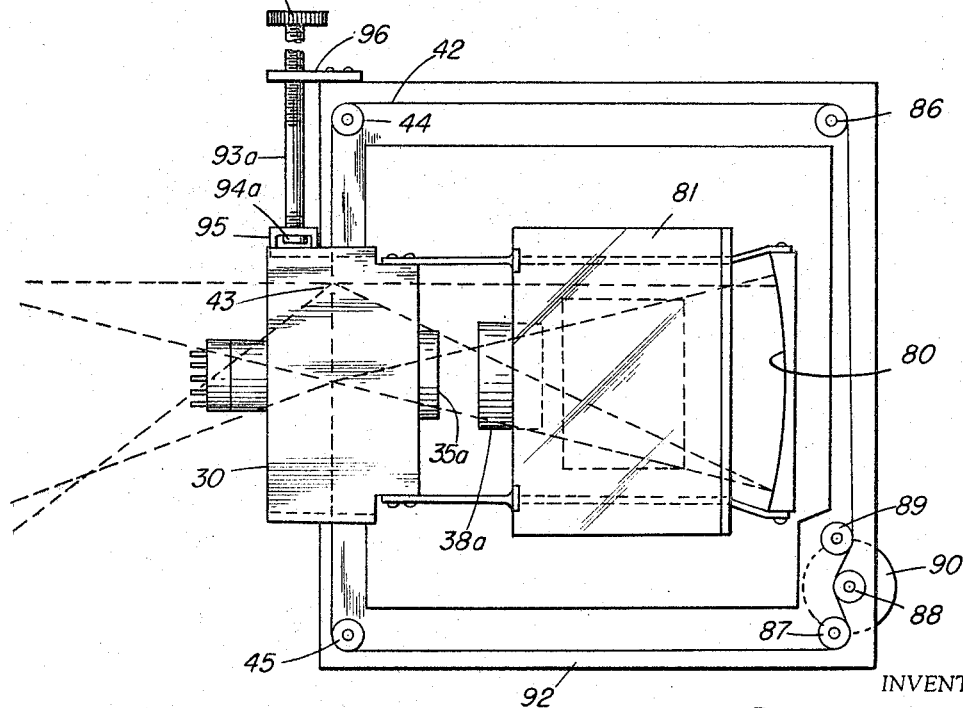
FIG. 4 is a simplified plan view, showing some further parts, of the camera of FIG. 3.
Figure 17:
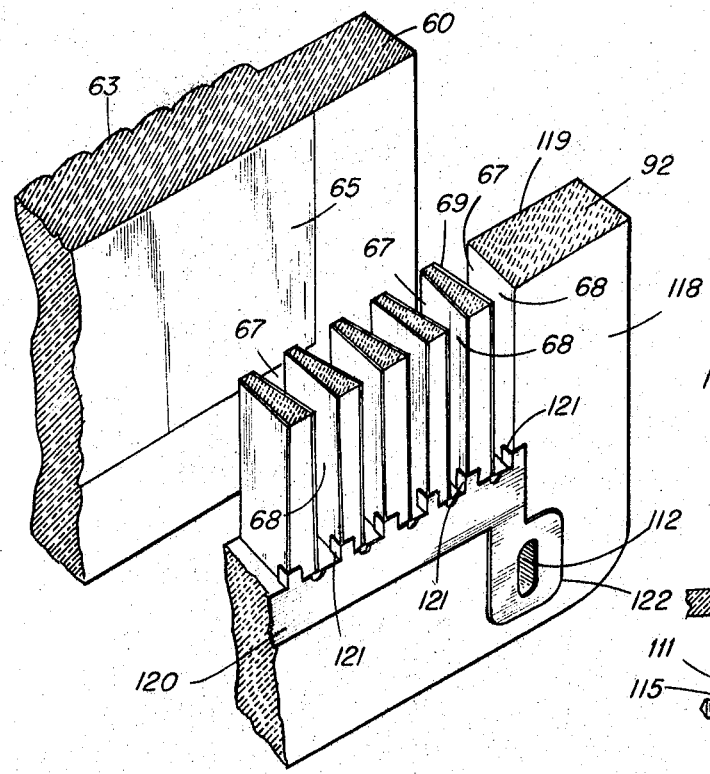
Figure 18:
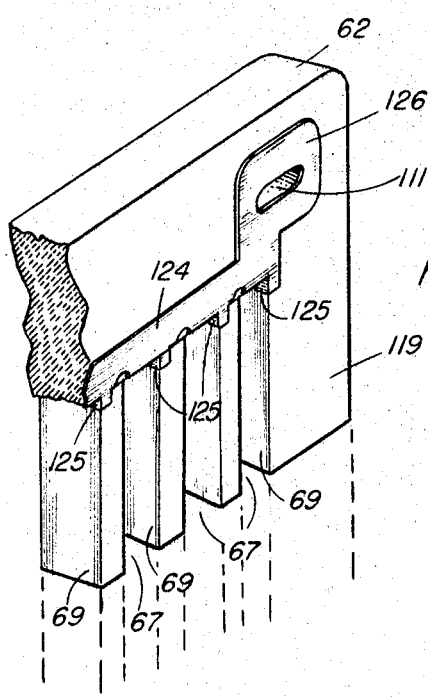
Figure 15:
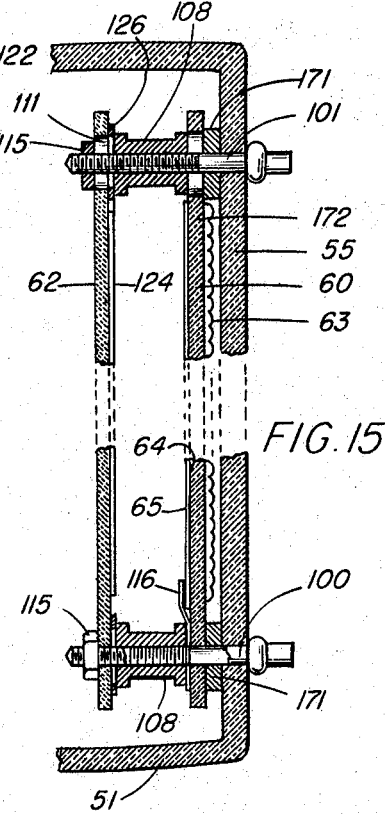
Figure 19:
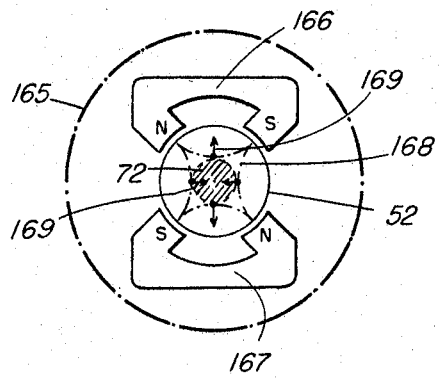
Figure 20:
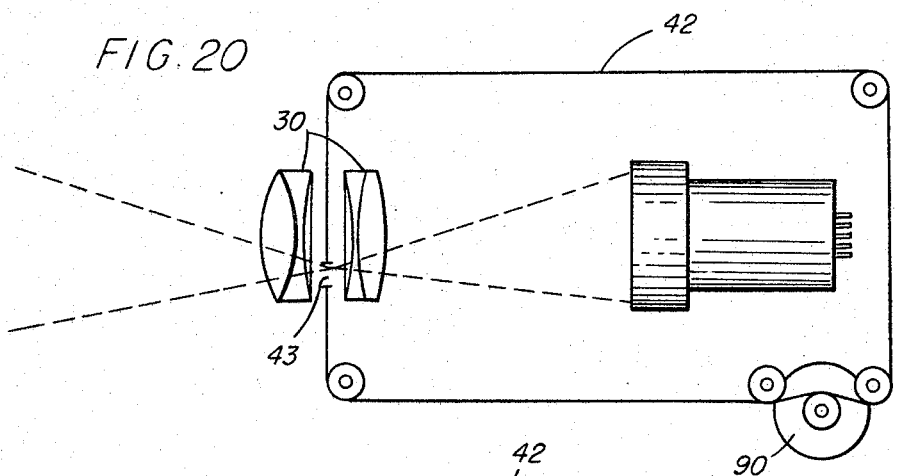
Figure 21:
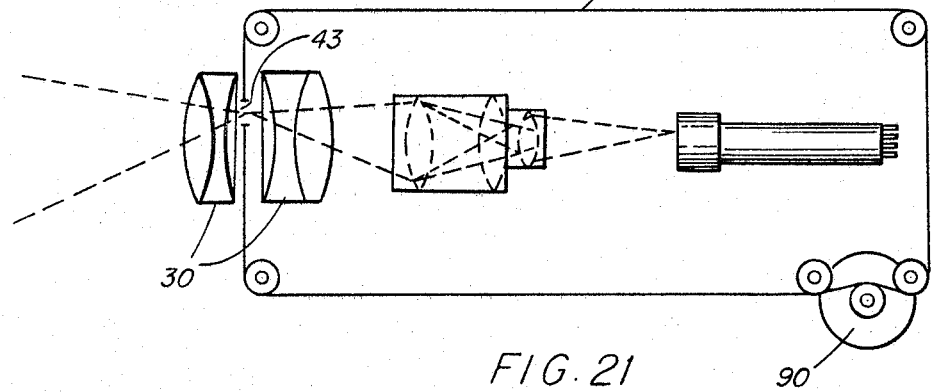

FIGS. 10 and 11 are respectively vertical sections on line 10—10 and 11—11 of FIG. 7, showing inner and outer faces of the lenticular screen element;

FIGS. 12 and 13 are respectively vertical sections on lines 12—12 and 13—13 of FIG. 7, showing inner and outer faces of the post-deflection grid;

FIG. 14 is a greatly enlarged, fragmentary, horizontal section, similar to a part of FIG. 7, illustrating portions of the lenticular screen and grid elements;

FIG. 15 is an enlarged horizontal section of the front part of the tube of FIG. 7, taken on line 15—15 of FIG. 8;

FIGS. 16, 16a and 16b are diagrammatic illustrations of aspect views exhibited by the picture tube and corresponding respectively to the aspect views of the camera as shown in FIGS. 1, 1a and 1b;

FIG. 17 is a greatly enlarged, fragmentary perspective view of a lower corner of the grid and screen as in FIGS. 12 and 10;

FIG. 18 is a greatly enlarged, fragmentary perspective view of an upper corner of the grid as in FIG. 13;

FIG. 19 is a transverse elevational view, including a section of the picture tube of FIG. 6, showing beam-shaping means that may be employed with the picture tube; and FIGS. 20 and 21 are schematic views, in plan, corresponding diagrammatically to FIG. 4 and showing respectively further embodiments of the camera system.

The methods and apparatus of the invention as set forth in the drawings are intended for embodiment in television systems utilizing components and circuits which may otherwise be conventional and which are therefore indicated (as in FIGS. 5 and 6 and elsewhere) in a purely symbolic manner; indeed it will be understood that various electronic circuits and devices, as well as conventional focusing, deflecting and other appurtenances of camera and picture tubes, may be employed in accordance with known or hereafter adopted practices of the art, regardless of indication or absence of indication of such features herein. Thus for example, it will be assumed that successive frames of picture signals are produced by a standard camera tube and converted into video signals on a suitable carrier with standard circuits, and on reception are converted with similarly suitable circuits at a receiving locality, into appropriate reproduction by the scanning action of an electron beam in a picture tube which in such basic respects may involve known features and appurtenances.

Referring now to FIG. 1, a camera system embodying the invention is shown, including a large diameter lens 30 disposed in viewing relation to the object or scene to be televised, for example as schematically indicated by the arrow or arrow-shaped object 31. While the lens or lens system 30 may conceivably be of complete circular shape as most usual in lenses, it is preferably fashioned as a central, horizontal segment in the manner shown, having a width of the full lens diameter 32, but having upper and lower portions in effect cut away on spaced horizontal planes so as to have a reduced vertical dimension, say of about one-fourth of its maximum width.

The optical system is designed to provide light images of the object 31 at the appropriate end face or plate 34 of a television camera tube 35, such as an image orthicon. While other optical systems can be employed as explained hereinbelow, FIG. 1 shows the lens 30 arranged to produce an image 36 of the object 31 on an appropriate screen 37 (shown here simply as a ground glass screen or the like). By the operation of a further small lens 38 a greatly reduced image 40 of the image 36 is projected on the faceplate 34 of the camera tube.

A continuously moving ribbon or shutter 42 travels across the lens 30 in closely adjacent relation, and preferably at the nodal plane thereof so that a slit or opening 43 in the ribbon is caused to traverse the lens in a horizontal direction whereby image-forming light rays, directed to the screen 37, are only allowed to pass through the lens at the region of the aperture 43, but successively pass the lens at different horizontal localities in accordance with the movement of the ribbon and aperture. The ribbon may be guided by appropriate rollers as at 44, 45, and driven in its described path by suitable means as explained hereinbelow. The aperture 43 conveniently described as a scanning slit, may be of upright rectangular configuration, preferably having a width which is only a minor fraction of the horizontal dimension of the lens 30.

With the moving shutter aperture or scanning slit 43, the system thus in effect looks at the object 31 from a series of aspect angles in sequence as the slit crosses the lens. For instance in the extreme right-hand or initial position of the slit as indicated at A in FIG. 1, the object 31 is viewed from a correspondingly extreme right-hand position. At a central and later location of the slit as represented by dotted lines at B, a correspondingly central aspect view is obtained, while at the final or last slit position C, the object is observed from an extreme left-hand position.

Assuming, for example, that the lens 30 has a width equal to twice the average distance between the eyes of a person, i.e. two pupillary distances (although it is in fact preferred that such width be at least several pupillary distances), it will be seen that a view through position A is the same as would be seen by the right eye R of an observer at such position while the aspect at location B is as would be perceived by his left eye L. A similar relation would exist between positions B and C. Assuming further that there is a more remote plane (than the object 31) in the observed scene, e.g. at 47, where an observer at the region of lens 30 can see more or less of objects behind the arrow 31, depending on the aspect angle of viewing, say, the left-hand end of such objects would appear at the left-hand side of the arrow 31. For convenience in the drawings these further objects are represented by the letters X, Y, Z. Hence in the image 36 projected on screen 37 through the A-position of lens 30, only the remote object X is seen, while in image 36a (FIG. 1a) such as would be produced by rays traversing location B, remote objects X and Y are visible, and likewise in image 36b (FIG. 1b), when the slit 43 is in position C all three objects X, Y and X appear. In consequence, effective stereoscopic relations are obtained with respect to appropriate pairs of images sequentially produced on a screen 37, e.g. in that such images represent suitably different aspect angles. They afford the desired illusion of depth in that if viewed by different eyes, a different extent of remote objects or the like will be seen adjacent the edges of near objects.

In further accordance with the invention, the speed of the ribbon 42 is such that the slit 43 crosses the lens while at least a plurality of complete frames are scanned by the camera tube 35, and preferably at least several frames, so as to afford a corresponding continuum, so to speak, of aspect elements in each image component, i.e. a multiplicity of such elements, when the transmitted picture is established for viewing at the receiver in the manner explained below. In a simplified sense, for instance, each of the images 36, 36a and 36b could constitute a single complete frame in the pick-up tube 35, i.e. a complete scanning trace such as conventionally made up of two successive interlaced traces between top and bottom of the electronically scanned area on the faceplate 34. Preferably there are a multiplicity of complete frames scanned as the slit 43 traverses the lens, with corresponding superiority, for many purposes, of results. Although during the brief interval of each frame of scanning in the tube 35, the slit 43 is changing position to a slight extent, the effect on resolution and definition in the ultimate image is generally negligible. Indeed the effect of such movement and likewise the effect of the double nature of the scanning trace in conventional systems if utilized, are such as to reduce or obviate any possibility of flicker, and also to contribute to the effective integration of adjacent aspect elements in the ultimately reproduced view at the receiver. The latter type of integration is desirable in avoiding any unwanted jumps or discontinuity of picture as the observer moves somewhat laterally while viewing the received image.

By way of further explanation of the optical system, it will be noted that the large lens 30, which may be a photographic-type lens as stated below, is adapted to project an image of the object 31 on the screen 37, as if on the film or plate in a conventional camera. The aperture or slit 43 in the ribbon 42 functions to prevent passage of the light rays through the lens at any locality except the open area of this aperture 43. Since every portion of a lens in effect sees an entire object field and thus receives light rays from all parts of such field, each such portion of the lens can, of itself, function to produce an image of the entire object at the appropriate plane on the other side of the lens (e.g. here on the screen 37), but it does so only with those rays which converge to the limited area of such portion of the lens. Indeed the path followed by every light ray (that travels from anywhere in the entire object field) to and through the lens 30 is fixed solely by the position of the lens; the function of the ribbon 42 is simply to interrupt all such rays except those that happen to follow paths (in the lens) through the region of the opening 43.

Hence as the aperture 43 moves across the lens, there can be no appreciable effect whatever on the position and path of any given ray of light or on the refraction of rays by the lens, except to cut off those rays which strike the opaque portions of the ribbon. In this respect, the aperture is basically no different from a conventional diaphragm opening in or adjacent any photographic lens, i.e. converting a given lens to one of smaller aperture. In the present case, however, the aperture occupies positions successively located across a large lens, so that the small lens (which is in effect created at each average disposition of the aperture corresponding to a scanning frame in the tube 35) looks at the whole object from successively different angles. The result is that the complete images on the screen 37, which are scanned by the tube 35, are views of the entire object taken as if from different angular positions, e.g. from the several positions A, B, C, etc.

As stated, the ribbon or shutter 42 is placed closely adjacent the lens or preferably in a nodal or central plane thereof, it being apparent that such disposition is the same as for conventional lens-plane or between-lens shutters and diaphragms in photographic cameras. As is well known, diaphragms and moving shutters at such localities have the sole function of reducing or altering the amount of light or the effective opening size of the lens, without impairing the function of the lens in its refraction of the light rays.

In the present case, whereas the large lens, without the shutters or ribbon 42, will have a relatively shallow depth of field (as considered crosswise of the scene), e.g. essentially limited to one plane of the object 31, and would tend to present only blurred images of all points X, Y and Z (since different parts of the lens see these points in different positions), the reduced width aperture which is uncovered by the opening 43 during a scanning frame of the camera tube 35 increases the depth of field according to known optical principles, bringing things in the plane 47 into sharp definition in the image on the screen 37, while at the same time revealing more or less of the points X, Y and Z, depending on the immediate average position of the aperture. Hence the continually changing image on the screen 37 represents in effect a rapid series of suitably defined views of the entire scene, from successive, different aspects; it having been noted that each scanning frame of the tube 35 requires only a minor fraction of the total traverse time of the slit 43 across the lens 30, and the effective aperture produced by the moving slit 43 during such frame time does not become wide enough to impair appreciably the desired depth of field.

The optical system including the lens 38, which may be a short focus photographic lens as explained below, projects a new or second image 40 (of the primary image 36) on the face plate 34 of the camera tube 35, whereby the tube in effect scans the image 36.

It will therefore now be understood that the tube 35 generates video signals representing repeated cycles of scanned frames, each cycle being a sequence of such frames representing different aspect angles as the slit 43 traverses the lens 30. Conveniently the ribbon 42 may be provided with further identical slits as at 43' and 43", so that as soon as one slit has completed its traverse another begins to cross, for an immediate repetition of the cycle. The movement of the ribbon shutter, and thus both the number of frames per cycle and the number of cycles per second, are appropriately synchronized or timed, i.e. in relation to the frame frequency of deflection in the tube 35, so that these relations are constant. Indeed the operation of the ribbon (as explained hereinbelow) may be timed with the synchronizing pulses conventional for the operation of the tube and the ultimate synchronization of reproduction at the receiving station.

FIG. 2 illustrates, as a further feature of the invention, a presently preferred mode of establishing suitable images derived from the signals of the system in FIG. 1, at a remote receiving locality. In particular, such receiving system comprises a picture tube generally designated 50 having the usual glass or like envelope 51 with a cylindrical neck 52 that contains a conventional electron gun 53 and other internal and external appurtenances (such as the deflecting coils designated by the structure 54) for converting video signals and synchronized sweep pulses into the desired modulation and trace pattern of an electron beam. Instead of a simple phosphor coating on the inner side of the transparent end face 55 toward which the electron beam is projected, the tube of the present invention includes a transparent component-resolving screen 60 and a post-deflection grid 62. The screen 60 comprises a sheet or plate of glass or other transparent material having vertical, parallel lenticular ridges 63 formed in its outer surface, i.e. adjacent, and preferably closely adjacent, the inner side of the end face 55. The rear face of the screen 60 is provided with a coating 64 (see FIG. 14) of a suitable phosphor, i.e. to emit light upon impingement of electrons in the conventional manner of cathode ray tubes as designed for television use. The phosphor layers may also, as is known in present television practice, have a thin metallic film 65 on its rear surface, e.g. an evaporated aluminum film which may be electrically connected for coaction in the operation of the electron beam and for optical improvement of the image by reflection outwardly of light that might otherwise be lost. As will be seen in FIG. 14, each of the lenticulations 63 may constitute a portion of a cylindrical surface, the axes of such surfaces being parallel lines all lying in a plane appropriately disposed within the screen body 60 and parallel to its rear face.

Spaced behind the screen 60, i.e. in a direction toward the electron gun 53, but relatively close to the screen, there is disposed the grid 62 for locally deflecting the electron beam in accordance with the aspect character of the view or frame which the beam at a particular instant is in the course of producing. The grid 62 is in effect constituted by a row of vertical channels or slots 67, parallel to each other in a plane region spaced from and parallel to the screen 60. The individual slots (see also FIG. 14) are bounded by vertically-extending conductive members which may be metal wires, ribbons, strips or other shapes, but are advantageously exemplified as metal films or coatings 68, 69 on the edge faces of slots formed in a body 70 of ceramic or the like, constituting a supporting structure of the grid 62. This supporting structure is omitted for simplicity in FIG. 2.

Referring further to FIG. 14, as well as FIG. 2, it will be appreciated that an electron beam, as at 72 in FIG. 14, or at 72a or 72b in FIG. 2, will pass through successive slots 67 as it horizontally traverses the grid 62 during its prescribed trace. In accordance with suitably synchronized signals, opposite sides 68, 69 of each slot are appropriately polarized, for example by a potential which varies progressively from a high positive value on one side to a correspondingly positive value on the other side. Hence the electron beam undergoes local deflection by the electrostatic action of the slot-forming conductors 68, 69. The extent and variation of the deflecting potential is synchronized with the passage of the silt 43 across the lens 30, so that each time the beam traverses a given slot, it is directed to a position at the rear face 64–65 of the screen 60, behind a given lenticulation 63, which corresponds appropriately with the position of the slit 43 at the selected instant. The slots 67 are arranged in registration with the lenticulations 63, e.g. each element 63 is accompanied by a slot disposed perpendicularly behind it and having a common center line or plane with the lenticulation.

More particularly, when the electron beam, for instance, is scanning the frame produced by the camera tube 35 while the slit 43 is at position A in FIG. 1, the slot faces 68 are at a maximum positive value and the faces 69 correspondingly negative. The beam is thus deflected to position A (FIG. 14) back of the screen, e.g. at one side of the corresponding resolving element that is bounded by a single lenticulation 63. When the frame corresponding to slit position B is scanned, the potential on the slot element 68, 69 has been altered, say to a value of zero or no difference, so that the beam travels directly to position B at the center of the screen component. Finally, in this simplified example of operation, when the slit 43 reaches locality C, the grid potential conditions have been further changed so that elements 69 are fully positive, with elements 68 negative; as the beam enters each slot it is thus deflected to position C.

In accordance with the function of lenticular screens of this character, an observer watching the images illuminated by the phosphor 64 sees only those views which are made up by the aspect elements selectively appropriate for the position of his eyes. For instance, as noted in FIG. 2, the viewer appropriately placed to observe along lines A and B respectively with his right and left eyes, will see only the corresponding aspect element positions at the rear face of the lenticular screen. When the frame derived from position A is established as an image in the phosphor 64, such image will be confined to locations A on the screen, and these will be seen by the observer's right eye. The image of the frame corresponding to position B will likewise be depicted by aspect elements at localities B of the phosphor, such image being then seen by the observer's left eye. Since the resolving function of the screen 60 is such that neither eye will see aspect elements at any but a single position, it will be understood that as successive frames are reproduced in the tube 50, each eye of the observer sees only those frames which represent a single, appropriate aspect view. For instance, in the situation just described, the observer's right eye sees aspect A, being a reproduced image 73 (FIG. 16) corresponding to the image 36 of FIG. 1. Likewise the observer's left eye sees aspect B, being an image 73a (FIG. 16a) corresponding to image 36a of FIG. 1a. At the same time, but unseen by this observer unless he moves his head, a further images 73b will be produced in due sequence (FIG. 16b) as representing aspect C and being equal to image 36b of FIG. 1b.

Thus by the post-deflection grid 62, successive frames or images are divided into vertical aspect elements and in effect established at appropriate localities at the rear face of the lenticular screen, for constituting a stereoscopic view. While the images selectively seen by the observer, as resolved in proper stereoscopic fashion by the lenticular screen 60, are sequential in time for his respective eyes, the sequence can be conveniently of sufficient rapidity to afford the desired continuity of motion in the scene and an appropriate avoidance of flicker or the like. That is to say, there will be one aspect view for each eye, per cycle of traversal of the lens 30 by the slit 43, and such traversals may conveniently be repeated with a frequency to achieve the desired result. Indeed the illusion of continuity may be attained with a lesser number of frames seen per second (than in other fields of kinematic display), where the scene is sequentially viewed by right and left eyes, as in the present procedure, while the successive scanning of the two interlaced traces in each frame further contribute to the appearance of continuity. In any event, effective stereoscopic representation is achieved, as to objects and scenes viewed with the camera operation and system of FIG. 1.

In the above operation it will be understood that at any given time those localities of the phosphor screen which are not impinged by the electron beam while it scans to reproduce the aspect image then under view by the camera, remain dark. If such aspect being scanned has its elements in such position (in vertical lines back of the lenticulations) as to be seen by one of the observer's eyes as appropriate for such eye, the screen remains dark for the observer's other eye. Indeed it is essentially dark for his observation at all times except when the particular aspects at the viewing position, are scanned at their respective times in the cycle of aspect traversal by the slit 43 of the camera. As explained above, the frequency of frames per cycle of slit travel, as well as the frequency of slit traversals, are selected to provide the desired continuity of motion and avoidance of flicker.

As also explained above, the width of the lens 30 (FIG. 1) is preferably equal to at least several pupillary distances, so as to provide enhanced stereoscopic effect over a considerable range of movement of the observer sidewise of the viewing screen. Moreover, the number of frames scanned per aspect cycle (i.e. per traversal of the lens by the slit 43) is also preferably at least several in number, even for lens widths of no more than two or slightly less than two pupillary distances. In other words, the preferred operation is such that a multiplicity of aspect elements are progressively reproduced across the space of each lenticulation 63 at the rear face 65–64 of the screen 60, whereby, for example, sidewise movement of the observer through a space equal to a single pupillary distance, may present a number of successive aspects, in properly separated relation, to each of his eyes. Stated in another way, if in FIG. 14 the horizontal distance AB at the rear of the screen 60 represents an aspect difference corresponding to a pupillary distance, there will be at least several aspect elements established in sequence along this region, i.e. successive thin vertical bands produced by successive frames with the electron beam progressively moved toward A toward B by the function of the deflecting grid 62.

For illustration, the images in FIGS. 16, 16a and 16b have been depicted as showing different numbers of background objects seen (as on the line 47 of FIG. 1) from correspondingly different aspects. Thus in FIGS. 16 and 16a the observer's right eye will see the background object X, while his left eye will see background objects X and Y, at the left of the scene or object in focus (73 or 73a). In other words, the observer's eyes see different extents of background, exactly as occurs in natural binocular vision, in looking at a near or moderately near object. Hence the illusion of three dimensions is produced in an entirely natural manner. Especially with further aspect views intermediate those shown in FIGS. 16 to 16b, sidewise movement of the observer will maintain a stereoscopic presentation at all times, with a full appearance of relative movement between the principal object (73 to 73b) relative to other objects, as in the background.

Figure 3:
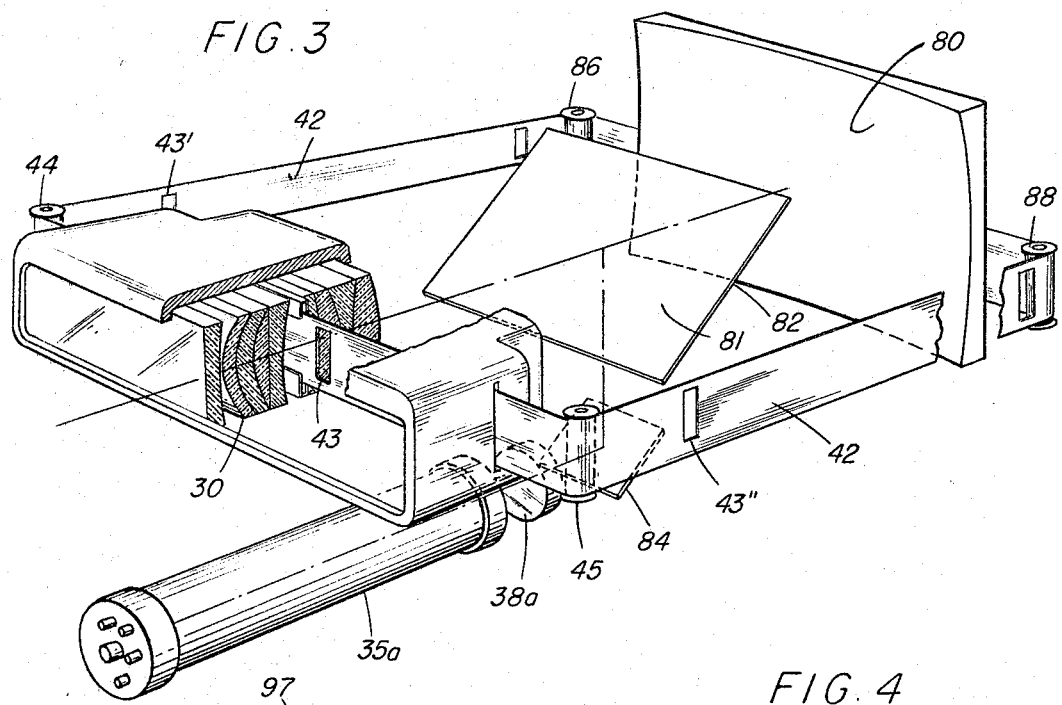
FIG. 3 is a simplified, perspective view, with many structural parts omitted, of the refined embodiment of the camera of FIG. 1.

FIGS. 3, 4 and 5 show further details of one embodiment of the camera system of FIG. 1. While optical systems disposed in a single long path (as in FIG. 1) may be employed, convenience is served by an arrangement involving reflected paths as shown in FIGS. 3, 4 and 5, wherein the image of the principal, large viewing lens 30 is formed on a white screen 80, the latter being then viewed by a rearwardly aimed camera tube 35a, disposed at a locality below the main lens 30.

The optical system for the latter purpose may include a partially transparent mirror plate 81 mounted at an angle of 45° to the optical axis of the lens 30 and having a mirror coating on its rear surface 82, this structure being conveniently a clear optical flat, e.g. of glass, mounted at the stated angle between the lens 30 and the screen 80 and having the described reflective property, say of 50%. Thus light from the lens 30 traverses this element to form the primary image on the screen 80 while observation of the latter is obtained by reflection from the rear or undersurface 82 of this element 81. The further optical path from the latter surface includes another 45° mirror 84, disposed parallel with the mirror element 82 and having a full, first surface, reflective coating so as to project rays from the mirror 82 horizontally at the optical axis required for the image orthicon tube 35a. An appropriate lens 38a is interposed in the optical path between the mirror 84 and the tube 35a so that a secondary image of appropriately reduced size is formed on the faceplate of the tube. By the described system, a compact arrangement is achieved, with the tube 35a arranged to have a continuous view of the image on the screen 80. The latter may have appropriate diffuse reflecting properties and may be rather considerably directional for the optical axis of the path to the tube 35a. The surface of the screen may thus be of conventional finely beaded or other character, as known in the art of projection screens. Advantageously the screen 80a may have a shallow concave surface as indicated whereby the ultimate flat image on the plate of the tube 35a is in effect slightly crowded toward its edges. This distortion then conveniently accommodates a flat or plane screen 60 (or phosphor surface 64) in the ultimate receiving tube 50, the effect of the sweep of the electron beam near the boundaries of the flat screen in the receiving tube being such as to spread out the image in such localities and thus restore linearity.

The slotted ribbon 42 is conveniently a continuous band and extends not only around the rollers 44, 45 which guide it for traverse of the lens 30, i.e. in the nodal plane of the latter and conveniently between forward and rear groups of lens elements as shown, but also extends around rearward supporting rollers 86, 87, behind the screen 80 to complete the continuous loop. At an appropriate locality in the path of ribbon travel, driving means are provided, for instance as constituted by a driving roller 88 and a counter roller 89 arranged near the guide roller 87 so that the latter also acts as a counter roller, with the roller 88 engaging a loop of the ribbon under tension as illustrated. The roller 88 is in turn driven by an appropriate synchronous or synchronized motor 90, adapted (with the aid of internal gearing, not shown) to effectuate ribbon travel at the desired speed under supply of appropriately alternating or pulsating electric current. Although appropriate sprocketing (with corresponding holes in one or both edges of the ribbon) may be utilized at the several rollers for optimum precision of synchronization, the arrangement in the drawings is shown with only frictional engagement of rollers and ribbon for simplicity.

As apparent from the several views, the parts are supported by suitable mounting structure, which need not be described in detail. The ribbon-carrying system, including the rollers 44, 45, 86 to 89 inclusive, and the motor 90 are likewise suitably mounted, as on a unitary horizontal plate or frame 92 which may be appropriately supported so that it can be moved bodily in a transverse direction, i.e. crosswise of the optical axis of the lens 30. One set of a plurality of sliding supports for such frame is indicated at 93–94 in FIG. 5. While as will be understood from further discussion of the television system below, electron means can be utilized for timing the beginning of each traversal of the slit 43 (across the lens 30) with each beginning of a sweep of the electron beam between the elements 68 and 69 of the post-deflection grid (FIGS. 2 and 14), mechanical means can also conveniently be employed as shown in FIG. 4. Thus the lateral position of the frame 92 is readily adjusted by a lead screw 93a rotatably held against axial displacement by a head 94a within a fitting 95 carried by the fixed structure of the camera. The lead screw is threaded through a lug 96 on the frame 92, so that upon turning the knob 97 of the screw, the ribbon assembly may be moved in one direction or the other along the path of the ribbon through the lens. Hence the exact time at which each of the successive slits 43, 43', etc. enters the optical opening of the lens can be adjusted by operating the knob 97.

The structure of the receiving tube 50 and its several screens is more particularly shown in FIGS. 7 to 15 inclusive and FIGS. 17 and 18. As explained above, the picture tube includes a conventional glass envelope 51 having a front face or wall 55 which may be an appropriate plane plate of lead glass or the like. Sealed in the outer plate 55 threre are four mounting studs of suitable metal 100, 101, 102 and 103 adjacent the corners of this substantially rectangular plate. These mounting studs may be of suitably threaded character, in their rearward projection within the tube envelope, and have appropriate post structure at their outer ends, for electrical connection as by clips or the like. The lenticular screen 60 may be constituted as a glass plate (FIGS. 10 and 11) having the vertical lenticulations 63 over a major central region as shown and provided with openings 104, 105, 106 and 107 respectively to accommodate the studs 100 to 103 inclusive. Separated by suitable spacing collars 108 rearwardly of the plate 60, the post-deflection grid 62 may constitute a sheet or plate of ceramic material having a substantially rectangular contour similar to that of the screen 60, and may likewise have corner openings 110, 111, 112 and 113 to fit over the posts 100 to 103 inclusive. The entire assembly is then retained in place by nuts 115 on the outer ends of the studs 100 to 103, i.e. screwed down against the rear side of the grid plate 62.

If desired, the described assembly may include appropriate tolerance for thermal expansion or contraction of the several parts while maintaining accurate vertical and horizontal alignment, i.e. by mutual rectangular positioning. Thus each of the holes 104 and 110 can be dimensioned to fit closely over the stud 100. The holes 105 and 111 may be horizontal slots having a width which closely fits the stud 101, while the holes 106 and 112 can be vertical slots, again with a width closely accommodating the stud 102. Finally the holes 107 and 113 may be appropriately larger than the accommodated stud 103 in all directions, being simply a larger circular opening. With this arrangement, both of the plates 60 and 62 are anchored against any angular displacement in their respective planes, but may each expand or contract in both vertical and horizontal directions if same is necessary to accommodate any differential thermal effects among the faceplate 55, the screen 60 and the grid plate 62.

As indicated above, the plate 60 carries the lenticulations 63 on its outer face, very closely adjacent the inner side of the plate 55, while the inner or rearward face of the plate 62 has a corresponding coating of phosphor 64 and a thin metallic film 65 (FIG. 14), with appropriate electrical connection to the latter as represented by the thin lug element 116 at one corner. This lug element overlaps a part of the metal surface 65 and is arranged to be engaged (FIG. 15) by the metallic collar 108, which can be threaded on the stud 100 as shown.

As already described relative to FIG. 14 and as further shown in FIGS. 17 and 18, the post-deflection grid plate 62 consists of a thin sheet of rigid ceramic material (shown in greatly exaggerated thickness in FIGS. 14, 17 and 18, as likewise also the screen 60) having a multiplicity of vertical, parallel slots 67. These slots advantageously taper from narrow openings on the rear face 118 of the plate 62 toward wider openings at the front face 119, and are lined by metallic films 68, 69 in the regions between the front and rear surfaces of the plate, such films constituting the electrostatic grid as described above. These sets of metal films or grid elements are respectively connected to different terminals. Thus a horizontal metal strap or ribbon 120 on the face 118 extends across the latter below the lower ends of the slots 67 and has upward lugs 121 bent inwardly and secured in electrical contact with the slot walls or films 68. This strap 120 has an extended lug portion 122 around the opening 112 so that it may be engaged by a corresponding one of the metal nuts 115, i.e. on the post or stud 102, for electrical connection through the latter.

The front face 119 of the plate 62 carries a similar thin metal strap 124 extending horizontally above the upper ends of the slots 67 (FIGS. 13 and 18) and provided with downward lugs 125 that are bent inwardly and held in electrical contact with the metal coatings 69 on the slot walls opposite to those which carry the coatings 68. The strap 124 also has a lug portion 126 around the opening 111, to be engaged by the metal spacer 108 on the post or stud 101 (FIG. 15), whereby electrical connection may be made through the post to the grid members constituted by the slot wall coatings or films 69.

As now described, the assembly of the lenticular, phosphor-coated screen 60 and the post-deflection grid 62 is mounted in precise position at the rear of the tube face 55, with provision for external electrical connection to the grid elements through the studs 101 and 102, and to the metal coating 65 on the phosphor 64, through the stud 100. The remainder of the picture tube 50 may be essentially conventional, including the electron gun 53 and the usual means therein for varying the intensity of the electron beam in accordance with received (video) signals, there being also the usual appurtenances external to the neck of the tube, the horizontal and vertical deflecting coils (or equivalent means within the tube) being thus provided as indicated schematically at 54 for causing the beam to establish the conventional raster at the locality of the assembly 62–60.

Although the grid device 62 may be made in a variety of ways, even as a simple assembly of vertical wires or metal ribbons (with insulating spacers between the slot-forming pairs of such members), a notably effective construction involves etching (i.e. chemically milling) the slots in a thin sheet of glass or like material, and then depositing thin films of metal, e.g. aluminum, on the walls of the slots while stopping off the faces of the sheet. Such operations can be achieved by printing etch-resist material in the pattern of the areas to remain solid, and after chemical milling, subjecting the device to vacuum metalizing while maintaining removable coatings on the faces of the sheet. An exceptionally satisfactory process, for example, resides in the use of photographically sensitive glass, such as so-called Fotoform glass, which is first exposed, as on the face 118, through an ordinary photographic negative of the pattern of the slot areas, the remaining areas being thus, in effect, screened from exposure. Thereupon the sheet is heat treated in accordance with known procedure, to convert the exposed regions to etchable glass. By then etching through (no stop-off being needed for the unexposed and therefore inert areas) the treated regions, the slots are formed in the sheet; by etching from the side which is intended to become the rear face 118, the etched areas become progressively wider as they deepen. In this way the desired flare or taper is directly achieved, or alternatively special control of the etching operation can be employed to get the shape illustrated. Finally the walls of the slots are coated with metal, as by vacuum deposition of aluminum. Very preferably the sheet, before metalizing, is converted by known procedures to ceramic state, designated in one process as Fotoceram. In this way a very thin but strong and heat resistant grid is produced with a dimensionally precise pattern of slots having electrically conductive walls.

The association of the camera and receiving or picture tube respectively with television transmitting and receiving circuits is shown in FIGS. 5 and 6, it being understood that conventional components are shown in extremely simplified form. With reference first to the transmitter system of FIG. 5, there may be the usual circuits 130 for generation of synchronizing pulses, the usual circuits for energization and control of deflection and other elements of the camera tube 35a, as well as for amplifying the produced picture signals, all such circuits being generally designated 131, and appropriate circuits 132 for generating and amplifying the desired carrier and for modulating it with the picture and synchronizing signals. The camera tube 35a, whether of the orthicon, image orthicon or Vidicon or other suitable type, will be understood to have such focusing, alignment and deflection means as may be required, here indicated collectively by the structure 133. Suitable power supply (not shown) may be provided, energized from and timed for synchronization by a conventional 60-cycle A.C. source. While in some cases the motor 90 for driving the aperture-scanning ribbon 42 may be energized (and directly synchronized) from the same 60-cycle line, an effective arrangement is to drive the motor with pulses from the video synchronizing system, e.g. 60-cycle vertical synchronizing pulses as may be derived from the pulse generating system 130 or other suitable circuit of the transmitter, with amplification (not shown) as necessary. Since these pulses are also part of the transmitted signal, they are usable in the receiver (as described below) for controlling the sweep in the post-deflection grid.

Hence it will be seen that the system of FIG. 5 televises the image on the screen 80 and transmits corresponding signals from the antenna 134, while by the timed traversals of the slits 43, 43', etc., past the lens 30 (FIGS. 1 and 3), there is cyclic repetition of frame sequences each consisting of at least several frames representing views of the subject from successive aspect angles. The camera assembly may also preferably include a monitor section (shown in FIG. 5) including a cathode ray (picture) tube 135 arranged in generally conventional position to be viewed by the operator of the camera. This tube may be appropriately supplied and controlled with signals from the video circuits described above (including picture and synchronizing circuit sections 130, 131), through suitable amplifier and deflection circuits 136. Very preferably the monitor tube 135 is of the novel type shown in FIGS. 2 and 7, including a post-deflection grid and a lenticular screen as described above, and accompanied by suitable means as explained below in connection with FIG. 6, for controlling the sweep in the stated grid in synchronism with the travel of the ribbon 42 (such means being understood to be included in the circuit section 136), whereby stereoscopic reproduction of the televised picture is obtained in the monitor.

In FIG. 6 a receiving system is shown, for converting signals received by an antenna 140 from the transmitter of FIG. 5 into a stereoscopic view at the cathode ray tube 50, which may be as described above in relation to FIGS. 2 and 17 to 18 inclusive. The receiving system includes the usual video amplifying and detecting circuits 141, the usual circuits 142 for separating the synchronizing pulses, the conventional circuits 143 for supplying the coils of the deflection yoke 54, and appropriate power supply 144 energized from a 60-cycle A.C. line (not shown), all arranged and connected in appropriate manner, e.g. as is well known, for modulating and controlling the beam of the electron gun 53 to scan the phosphorescent surface 64 and thereby reproduce successive frames of pictures as established by the camera tube 35a (FIG. 5). As schematically shown, suitable voltage dividing means 145, e.g. of conventional resistance type, may be included in or with the power supply 144, for applying a high voltage from the terminal 146, via conductor 147, to the beam-accelerating coating 65 over the phosphor layer 64 in the tube 50 (see also FIG. 8), in a fashion similar to the conventional application of high D.C. potential to such coatings. For completeness of illustration, the divider is also shown, at 148, as a source of other voltage or voltages for the conventional electron beam system, although it will be understood that any suitable arrangement may be employed for supply of D.C. potential to these and other known elements of the receiving apparatus.

Means 150, including a saw-tooth oscillator, are also provided for applying the desired sweep voltage to the sets of elements 68, 69 of the post-deflection grid 62, in synchronism with the frequency of traversal of the aspect-selecting slits 43 in the camera system. The oscillator 150 may involve a suitable circuit, as of a type known for other situations of electrostatic deflection, wherein the voltage across the output terminals 151, 152 reverses fully in each cycle, for instance so that the elements 68 have a maximum positive value relative to the elements 69 at the beginning of each cycle and drop linearly to an equal negative value near the end of the cycle, thereupon returning very rapidly to the original positive value for the beginning of the next cycle. The period of oscillation, i.e. the duration of each cycle, should equal the traversal time of the slit 43 across the lens 30 in the camera (FIGS. 1 and 5); thus for a conventional interlace scanning television system where the vertical synchronizing pulses have a frequency equal to twice the number of complete frames per second, the frequency of the oscillator 150 should equal the vertical synchronizing frequency divided by twice the number of complete frames (or by the number of half-frames) that are to be scanned during each traversal of the slit 43.

The oscillator 150 is thus conveniently arranged for control by vertical synchronizing pulses from the pulse separating circuits 142, and may include a trigger circuit with time delay means which after a given pulse blocks its response for an interval equal to or slightly less than the desired period of the oscillator. Hence a series of timing pulses for the oscillator are derived from the vertical synchronizing pulses at the desired lower frequency, viz. the above-defined fraction of the half-frame frequency. Frequency-dividing, triggering and oscillating circuits suitable for embodiment in the sweep system 150 are known and therefore need not be set forth in detail. As stated, the output terminals of the circuit 150, i.e. terminals 151, 152, are connected respectively to the grid elements 68, 69 via conductors 153, 154 (see also FIG. 8), and are bridged by a resistor 155 of suitably high value, from which a center tap 156 leads to an appropriate point on the voltage divider 145, e.g. a point 157 selected to maintain the grid elements at a desired average D.C. positive potential, somewhat less than that of the metal coating 65 on the phosphor 64.

Thus the electrostatic deflection effected locally near the screen 60 by the grid 62 is synchronized with the aspect-angle scanning in the camera. For example, as shown in FIG. 14, the electron beam 72 is deflected first toward the elements 68 (as it passes each slot 67) in the first half-frame of a cycle, and then progressively less toward such elements and eventually progressively more toward the elements 69, during successive half-frames of the cycle, while the camera system (FIGS. 1 and 5) is viewing the subject from successive aspect angles by reason of the traversal of the ribbon aperture 43. Hence the aspect elements corresponding to each view are sequentially established in the phosphor 64, i.e. each in its proper narrow vertical band at the rear face of the lenticular screen 60, behind each lenticulation; the successive bands within the width of the lenticulation are thus illuminated in sequence. Successive images are thus produced, respectively viewable from different angles in front of the screen, as illustrated in simplified manner in FIGS. 16, 16a and 16b. It will be understood that although only a narrow, minor part of the space behind each lenticulation is illuminated in each frame, it is the function of each such small cylindrical lens to project a bundle of parallel rays from all parts of the lens surface (as indicated at 160 to 161 in FIG. 14), so that the total image (derived in fact from the mutually spaced, narrow aspect bands) is seen as filling the entire screen.

As will now be clear, the sweep frequency in the grid 62 is equal to the traversal frequency of the moving slits in the camera, such synchronism being achieved by controlling both operations, in effect, from the vertical synchronizing frequency established in the transmitter. It is also necessary, of course, that the cycles of such sweep and traversal step off, so to speak, in time with each other, i.e. whereby the electron beam starts with full deflection at locality A in FIG. 14 at the same time (or approximately so) that the slit 43 is passing the initial locality A in FIG. 1. Minor phase adjustments to achieve such timing, and likewise major phase adjustments of the same sort relative to the monitor 135 (FIG. 5) or relative to a receiver in a closed circuit system, may be accomplished by turning the knob 97 (FIG. 4), to change the instant at which each slit starts to cross the lens. Another mode of adjustment, applicable individually to remotely situated receivers as in FIG. 6, involves the provision of an adjustable element, such as a resistor, in the synchronism-controlling means (not shown in detail) of the oscillator 150, whereby the frequency of the latter may be temporarily slightly increased until the above timing relation is established, as determinable by observation, whereupon such element may be readjusted for true frequency synchronism. An alternative method of timing may involve sensing the passage of a magnetized spot or the like on the ribbon 42, correlated with each slit 43 and thereby producing and imposing on the video signal train a special timing pulse, say, each time a slit begins to traverse the lens 30, such special timing pulse being then employed in the receiving operation, both for timing and synchronizing the oscillator 150 or equivalent means.

While conventional focusing means for the electron beam in the picture tube 50 may afford a sufficiently sharp spot at the phosphor surface for resolution of the aspect parts behind the lenticular screen, so that the lines corresponding to successive aspects do not unduly overlap, supplemental beam-narrowing means may be employed if desired, e.g. as indicated at 165 in FIGS. 6 and 19. One form of such device may involve permanent magnet means providing four magnetic poles spaced around the neck of the tube and alternating in polarity, such being a known arrangement for converting an electron beam which may be essentially circular in cross-section, into a ribbon-like beam, considerably narrower in one dimension. For instance, as shown very diagrammatically in FIG. 19 and with a grossly exaggerated representation of the electron beam 72, the arrangement may comprise two bipolar permanent magnets 166, 167 having their respective poles spaced around the neck 52 of the tube in a plane perpendicular to the path of beam travel at a locality between the electron gun 53 and the deflection yoke 54, the structure being understood to be such as to provide a quadrangular pattern of flux 168 around the beam 72. Hence electrons at lateral edges of the beam tend to move inward across the respective opposite vertical flux paths, while electrons at the top and bottom of the beam tend to move similarly outward, all as indicated by the arrows 169 in FIG. 19. By this special magnetic deflection, with the strength and positioning of the fields appropriately selected, the beam or pencil reaching the post-deflection grid 62 and the phosphorescent layer 64 is significantly narrowed and concomitantly expanded somewhat in a vertical direction so as to be ribbon-shaped for impressing a vertical section of a relatively thin line of stimulation of phosphorescence. In this fashion the aspect elements corresponding to a single camera-tube electronic scan of the subject will appear as thinner lines behind the respective lenticulations of the screen 60, where such narrowing of the beam is desirable as may especially be the case when a relatively large number of aspect-views are televised for each traversal of the camera lens 30 by a slit 43.

As indicated in all of the foregoing description, the sizes, dimensions and distances of separation of various parts in the illustrated camera and receiving equipment have not necessarily been drawn to scale, but indeed in large part are shown with some exaggeration for clarity of illustration, it being readily understood that suitable dimensions and other values are to be selected for achievement of the stated functions and results in accordance with well known principles of optics and electronics. While indeed a variety of sizes and size relationships of the parts, and a variety of types of components, e.g. lenses, screen and the like, may be employed, one example of suitable elements and arrangements is herein set forth. Thus in the camera system of FIGS. 3, 4 and 5, the lens 30 may be a large diameter multi-element photographic lens, as of the Ektar type, having effective opening or aperture of as much as 10 inches to 12 inches, i.e. in the direction of travel of the slit 43. A lens of this type, even a desirably fast one having a speed or focal ratio of less than $f2$ (say $f1.5$) has a relatively long focal length and produces a correspondingly large image. Hence it is ordinarily desirable to focus the image on a screen 80 and then reproduce a further, small image appropriate for a conventional camera tube, as by means of a relatively short focus photographic lens 38a, viewing the screen 80 by the mirror system 84–81.

As an example of construction of the novel features of the picture tube 50, both the end plate 55 and the lenticular screen 60 may be constructed of lead glass, the latter screen being disposed as by the aid of mica washers 171 on the pins 100–103 so that the lenticulations are no more than about 0.030 inch from the inner face of the plate 55. Although finer lenticulations may be employed in many cases, i.e. more of them per inch crosswise of the screen (or indeed in some instances fewer such elements per inch), an effective construction involves forty (40) lenticulations 63 per transverse inch, each lens element being a portion of a cylindrical surface having a width, chordwise of 0.025 inch. In such case, for ready viewing of the scene from a distance of 2 to 8 feet in front of the screen, the thickness of the flat (non-lenticulated) portion 172 of the screen may be approximately 0.050 inch, and the total thickness of the screen from the rear face to the high point of each lenticulation, may be 0.062 inch, each lens element having a radius of curvature of 0.02 inch.

The post-deflection grid structure 62 is, as stated, a thin cermic plate, spaced rearwardly of the inner surface of the screen 60 (being the surface which carries the conventional phosphor coating and the superimposed metallic film) by a distance of 0.3 inch, i.e. by the threaded spacing collars 108. The plate 62 itself may have a thickness of 0.03 inch, the number of slots 67 being identical with the number of lenticulations 63, e.g. forty (40) per transverse inch. Each slot has a width at its inner face 118 (first reached by the electron beam 72) of 0.01 inch, such slots widening to a transverse dimension of approximately 0.023 inch. Preferably each of the metal-coated slot walls 68, 69 makes an angle to the perpendicular of the grid faces of at least about 11°. In many cases such taper may be achieved by the above-described process of chemical milling, in that the etching acid tends to remove progressively wider areas of the glass composition as it eats through the plate toward the opposite face 119. Although the system may be designed for relatively large screen picture tubes as conventional broadcast television, one example of a tube suitable for many special purposes involves a lenticular screen where the area covered by the lenticulations is approximately 2.5 inches in height and 3.8 inches in width, with an over-all distance between the screen and grid assembly and the projective end of the electron gun of about 12 inches.

In the circuits of FIGS. 5 and 6, it will be understood that conventional wave forms, voltages and current values are employed for the conventional components or parts. A suitable voltage difference between the grid 62 and the screen coating 65 is of the order of 1500 to 2000 volts, the latter coating being positive relative to the grid. For example, a voltage difference of 1760 volts is applied between the terminals 146 and 157 of the divider 145, while the voltage between terminal 157 and the negative or ground end 174 of the divider may be selected in accordance with conventional principles of electronic acceleration appropriate for the desired tube construction, for instance 4000 volts positive at the terminal 157. The voltage swing of the sawtooth wave applied across the terminals 151, 152 is chosen to afford the desired deflection of the beam across a distance of approximately 0.025 inch, back of the respective lenticulations; one example of maximum voltage difference (between upper and lower peaks) of this wave is 84.657 volts.

Under present standards of television broadcasting in the United States the picture frequency is thirty (30) complete frames per second, each complete frame in effect representing two half-frames respectively scanning alternate lines of the complete raster, whereby there are sixty (60) such half-frames per second, each interlaced in effect with the succeeding (or preceding) half-frame. It is ordinarily deemed that within the band width of roughly 4.5 megacycles available for the carrier and with the standard number of horizontal lines of scanning per frame, no more than the stated sixty half-frames per second can ordinarily be used, having regard to the desired number of picture elements per horizontal line, for best picture detail and resolution. Accordingly, assuming that the present procedure and apparatus for stereoscopic television are applied to a system conforming with the above standards, it is apparent that the number of half-frames to be scanned by the camera tube 35 or 35a during each traversal of a slit 43 across the lens 30 (FIGS. 1 and 5), multiplied by the traversal frequency (i.e. the number of complete slit traversals per second) must equal sixty.

Thus by way of example, the motor 90 may be geared or otherwise adjusted to drive the ribbon 42 at such a speed that there are eight (8) half-frames scanned by the camera tube 35 or 35a during each complete traversal of the lens 30 by a slit 43. With the half-frame frequency at 60 per second, the motor is thus adjusted to drive the ribbon 42 at a rate providing 7.5 complete slit traversals per second. Since each eye of the observer (i.e. at R and L in FIG. 2) will in effect see two immediately succeeding half-frames per traversal of the slit at the camera, it will be apparent that each eye is then presented with 7.5 complete pictures per second, or fifteen half-frames (i.e. each being half of the interlace), succeeding in pairs, per second. While monocular vision at this rate would be characterized by some flicker and some intermittent nature of the illusion of movement, the latter effects are greatly reduced when both eyes of the observer are involved and alternately view a picture on the screen. Hence the effective transmission is of fifteen (15) complete pictures (or thirty half-frames) per second. Under these circumstances, reproduction is effective for many purposes, including a number of the special purposes mentioned hereinabove, while the realization of three-dimensional presentation is fully achieved, with all its advantages of display of depth and the like in reproduction of the scene.

It may be noted here that in the description above regarding the establishment of aspect elements behind the lenticulation 63 of the picture tube (FIGS. 2 and 6) and in defining such elements as each in effect constituting a laterally very narrow, vertical area or line, distinction has not been made between the effects of electron beam traversal for a half-frame and a full frame. That is to say, while the process and apparatus may be so adjusted and operated so that each eye sees no more than a single aspect element as provided by a half-frame of scanning alone, the normal or preferred function of the lenticulations is such, by design, that each eye sees actually two successive half-frames, the corresponding aspect elements merging laterally together (in area) and by persistence of vision representing a single view. Thus in most cases, the visible aspect element will consist of two successively established impressions corresponding to two succeeding half-frame scanning operations which result in immediately adjacent impingement of the phosphor by the electron beam within a given small aspect element area.

It will be understood that for special purposes, within the standard frequency of sixty half-frames per second, other arrangements of timing may be employed. For instance, a larger number of aspect views (and correspondingly larger number of aspect elements at the receiving screen) may be achieved, for superior realization of stereoscopic illusion or for better view by a number of observers, with timing of the ribbon 42 such that a greater number of half-frames are scanned for each slit traversal. Thus if the ribbon is driven at a rate to provide 3.75 lens traversals of the slit per second, there will be sixteen (16) half-frames scanned per traversal, or eight full frames, with like number of essentially discrete (although slightly overlapping) complete aspect elements, side-by-side behind each lenticulation of the picture tube screen. With appropriate modification of circuits and with utilization of special standards, e.g. a lesser number of horizontal lines per frame or a lesser number of picture elements resolved per line, or with both such modifications, a much larger frame frequency can be achieved within the normal transmission band width of 4 to 4.5 megacycles. Thus at a frequency of 120 half-frames per second, there can be 7.5 traversals per second and eight full frames transmitted for each traversal.

As a further alternative procedure, it is contemplated that greater band widths of the carrier may be employed, as for special purposes or in closed circuit or other operation not utilizing present television channels. Thus if a 9 megacycle band width is available for the carrier, present standards of horizontal scanning and picture resolution can be achieved with 120 half-frames per second and corresponding frequencies of slit traversal and of frames per traversal. Likewise, for instance, with a band width of 18 megacycles (with current horizontal scanning characteristics and picture element frequency), there can be eight (8) full frames per traversal of the slit, with slits passing at a frequency of 15 traversals per second, affording a very complete illusion of stereoscopic or three-dimensional reproduction and at the same time not only avoiding all flicker but achieving a very smooth and continuous effect of motion in the scene. As will be appreciated, choice of frequencies and other factors will rest with conditions and requirements of use in any case, within rather wide practical limits as exemplified in the foregoing description.

The general operation of the methods and apparatus has essentially been described in what has been said above. While the step of producing televised pictures corresponding to repeated sequences of different aspect views can in some cases be achieved by essentially moving a camera tube (with associated lens) repeatedly across a traversal space, a special feature of the invention involves the defined aspect-scanning operation as accomplished by the moving slit 43 or like means whereby such scanning is achieved with a simple, easily repeated movement of a part of the optical path. Thus the television of an object or scene is accomplished by simply aiming the camera equipment of FIG. 3 toward such subject, while the ribbon 42 is in operation at the selected speed and the camera tube 35a effectively converts the projected image into successive television frames, which are transmitted in the usual manner.

At the receiving station, whether signals have arrived via aerial transmission or by closed circuit, the transmitted pictures are re-created on the phosphor, but broken down into aspect elements with proper allocation of such elements to the appropriate regions behind the screen lenticulations, through the function of the post-deflection grid in synchronism with the aspect-scanning operation at the transmitter. Although the picture reproducing operation may broadly extend to other modes of imparting a varying angular displacement to the moving beam (as by means for imparting a bend of the nature of a kink or the like of cyclically changing extent and direction at some locality remotely rearward of the screen), the specifically described operation of local deflection close to the screen is a significant feature of invention, affording fully correct registration of the desired aspect elements with their proper places in relation to the lenticulations. Thus in receiving stereoscopic television pictures, the receiving circuits function to cause the electron beam to depict successive frames on the phosphor, while by the special, local deflection of the grid 62 the successive frames, in aspect-sequence, are allocated as aspect elements at the rear face of the screen 60.

In consequence, an observer of the picture tube viewing the lenticular surface, sees a three-dimensional image in the intended manner. Where the further specific feature of the invention, including the use of aspect traversal encompassing more than a single pupillary distance is employed, the view of the reproduced scene is not limited to a single position for the observer, but may be viewed by a number of persons and is characterized by the further illusion of relative motion between objects in the scene as the observer may move somewhat from side-to-side. It will be seen that the method and system afford a thoroughly staisfactory and yet essentially simple arrangement for stereoscopic television.

It will be understood that many details and features of construction or arrangement which are usually involved in or associated with various components of optical, electronic or other character as embraced within the procedures and systems of the invention, have been omitted from the drawings and decsription for the sake of clarity and simplicity, especially in that persons skilled in these arts will be familiar with such details and appurtenances. Thus for example, suitable means (not shown) are provided for focusing the lens 30 of the camera apparatus in FIGS. 1, 3, 4 and 5, as by the conventional mode of displacing one or more lens components adjustably along the optical axis, whereby the image on the screen 80 is brought into sharp focus, as may be determined by viewing the monitor 135. Means may also be provided (not shown) for focusing the second lens 38a of the system, whereby the image on the screen 80 is in turn properly imaged on the faceplate of the camera tube 35a. Since the optical path in the last instance may be conveniently fixed, such focusing may ordinarily require an initial adjustment and thereafter remain set over indefinite periods, or at least until the camera tube requires replacing.

FIGS. 20 and 21 show diagrammatically two modified arrangements of the camera apparatus, being views similar to FIG. 4 and illustrating devices intended for inclusion in systems such as that of FIG. 5. Specifically, in each of these views, the arrangement includes the same large lens 30 as in the other arrangements, for viewing the subject, together with the traveling ribbon or belt 42 carrying slits or apertures at spaced intervals, such as the slit 43, whereby successive aspects of the subject are observed as the slit traverses the lens. The motor means 90 is similarly arranged, in each case, to drive the ribbon 42, as explained hereinabove.

In the arrangement of FIG. 20, instead of focusing the relatively large image from the large lens 30 upon a reflective screen and then projecting a second, reduced image on the small faceplate of a standard camera tube, the image from the lens 30 is in this structure brought to a focus directly at the face 180 of a large diameter camera tube 181. It will be understood that such tubes, as of the nature of an image orthicon or a Vidicon can be constructed with optical-image-receiving surfaces of relatively large area (say, affording a diagonal dimension of 10 inches or more), and are arranged to function in similar fashion as the usual, compact camera tubes so widely used in the television industry. Whereas a large-face tube such as indicated at 181 may be more expensive to construct, the resulting arrangement of FIG. 20 has the substantial virtue of simplicity and to some extent, of compactness. Moreover, with equal sensitivity in the camera tube, the light efficiency or over-all light sensitivity of the system is improved, from being substantially fewer optical elements in the path from the main lens 30 to the electronically scanned locality of the tube.

In FIG. 21, a standard small face camera tube 183 is employed but in this instance a special reducing lens 184 is disposed in the optical path intermediate the large viewing lens 30 and the face of the tube 183, the lens 184 being such as to provide the equivalent of a greatly shortened focal length for the lens 30 and thus a greatly reduced image as compared with the image that would otherwise be formed by the lens 30. Lens configurations suitable for the purpose of the optical assembly 184 are known or understood in the general art of optics, but such arrangements are relatively expensive to manufacture. Hence, although the system in FIG. 21 has some advantages of simplicity and light efficiency, other systems hereinabove described are at present greatly preferred, especially the relatively least costly system of FIGS. 3, 4 and 5.

It is to be understood that the invention is not limited to the specific structures and operations herein shown and described but may be carried out in other ways without departure from its spirit.

I claim:

1. In stereoscopic television, the process comprising successively electronically converting at least several aspect-images of a subject into signals representative of said images, while establishing said images from at least several, corresponding different aspects distributed across a field of view of the subject and constituting at least a plurality of stereoscopic pairs of aspects distributed across said field of view, to produce said signals as defining a sequence of aspect-frames that constitutes a cycle of traversal of said field of view, and converting said signals to successive pictures viewable through an aspect-differentiating screen, by controlling, with said signals, an image-producing electron flow to a phosphor surface optically associated with said screen, while deflecting said flow to establish said pictures at successive sets of areas across said surface which are mutually laterally distributed to provide at least several, corresponding, respectively different aspect areas for said screen, in correspondence with the aforesaid cycle of traversal of the field of view.

2. A process as defined in claim 1, in which the step of establishing said images comprises optically traversing the field of view while projecting light from the subject for image formation, so that the images are sequentially produced from different aspects for the aforesaid conversion to the aspect-frame sequence of signals in each cycle.

3. A process as defined in claim 1, in which the image-producing electron flow is effectuated by directing an electron beam to the phosphor surface and scanning said surface by complete frames of scanning with the beam to establish successive picture-images corresponding to the aforesaid sequence of aspect-frames that constitutes a cycle of field traversal, and in which the said screen affords a multiplicity of vertical parallel components each for differentiating a plurality of vertical aspect elements of the phosphor surface, said elements constituting the aforesaid areas and each of said sets of areas being a set of elements across the surface related to the several components, said step of deflecting the electron beam comprising applying to it a laterally directed potential at a multiplicity of localities near the phosphor surface which are respectively related to the components of the screen, and varying the potential to cause the beam to impinge successive aspect elements of each component respectively in correspondence with the aforesaid cycle of aspect traversal of the picture signals, said potential being varied in synchronism with said sequence of aspect-frames in the cycle to establish said picture-images at said sets of aspect-areas in laterally distributed succession at successive times within said cycle.

4. In stereoscopic television, the process comprising electronically converting successive images of a subject into signals representative of said images, while repeatedly establishing said images in a cyclic series comprising single views each of said entire subject from a plurality of successive aspects in each cycle, by laterally confining the path of light from the entire subject to the image thereof in an area narrower than a pupillary distance, and repeatedly displacing said confined light path across a field of view of the subject to constitute successive single aspect-images each of the entire subject in each cycle, each traversal of the field constituting a cycle, and said electronic conversion being repeated in each cycle to provide a plurality of aspect-frames of said signals correspondingly representative of said aspect-images in each aforesaid traversal of the field.

5. In stereoscopic television, the process comprising receiving signals representing a series of cycles of aspect-frames of which the frames in each cycle are a sequence of at least several views of a subject from successive aspects distributed across a field of view and constituting at least a plurality of stereoscopic pairs of aspects distributed across said field of view, and converting said signals to images of said frames viewable through an aspect-differentiating screen, by applying said signals to control an electron beam and causing said beam to scan a phosphor surface optically associated with said screen, while deflecting said beam, at a multiplicity of localities near said surface, into image-producing impingement of the surface only at successive sets of mutually spaced upright areas which provide respectively different aspects as viewed through the screen, in correspondence with the aforesaid traversal of aspects of the subject in each cycle of frames, said deflection of the beam being effected by applying to it a laterally directed electrostatic field at each of said localities and varying said field through each cycle of frames in synchronism with the sequence of views constituted in said cycle, to cause the beam to impinge laterally successively different aspect-areas of the surface in the region of each said locality as the beam successively scans the surface to establish said several aspect-frames as the aforesaid images, for aspect-differentiation of said images by said screen, at successive times within said cycle.

6. In stereoscopic television, the process comprising receiving picture signals defining a cycle of aspect-frames which represent a sequence of at least several views of a subject from successive aspects distributed across a field of view and constituting at least a plurality of stereoscopic pairs of aspects distributed across said field of view, and converting said signals to images of said frames on a phosphor surface viewable through an aspect-differentiating screen which is optically associated with said surface and which provides a multiplicity of vertical parallel components each adapted for differentiating at least several vertical parallel aspect elements of said surface, by applying said signals to control an image-producing electron flow to said surface, while deflecting said flow by application of electron-directing fields thereto at localities spaced from the phosphor surface, into image-producing impingement of the surface only at successive sets of said elements which provide at least several respectively different aspects as viewed through the components of the screen, in correspondence with the aforesaid cycle of successive aspects across the field of view.

7. Television camera apparatus comprising a television camera tube, optical means for viewing a subject and for projecting an image thereof on said tube, said optical means including an optical device arranged for directly receiving rays from all parts of a subject and focusing said rays to form a single image of the entire subject at a locality spaced from said device, said optical device having an optical aperture substantially wider than a pupillary distance, viewing means disposed at said optical device and movable across the field of view of said optical device, said viewing means having a working aperture substantially narrower than a pupillary distance and correspondingly restricting the optical device to receive rays from all parts of the subject to form a single image of the entire subject only through said working aperture, and means for displacing said viewing means across said optical device through positions representing successive different aspects of view of the subject, for controlling the optical means to project successive images of the entire subject on the camera tube from correspondingly successive aspects.

8. Television camera apparatus comprising a television camera tube, optical means for projecting an image of a subject upon said tube, said optical means including a large lens which is arranged for directly viewing the subject and projecting a single image of the entire subject at a locality spaced from said lens, said lens having a working aperture of a lateral width greater than a pupillary distance, an opaque element disposed in the vicinity of said lens and movable transversely of said lens and having an opening less than one inch wide for limiting the light-passing area of said lens to the region of said opening, said element being disposed to permit light rays from the entire subject to traverse said opening to form a single image of the entire subject at said locality, and cycling means for moving said opaque element repeatedly across the field of view so that in each cycle images, each of the entire subject, are formed through said opening from laterally successive aspects of the subject.

9. Apparatus as defined in claim 8, in which the opening in the movable element is not more than about one-half inch wide.

10. Television camera apparatus comprising a television camera tube, optical means having a wide total aperture, for viewing an entire subject and for projecting a single image thereof on said tube, said optical means including viewing means movable across the field of view of said optical means, said viewing means comprising opaque means blocking the passage of light through most of said total aperture but having a narrow working opening much smaller than said total aperture, said optical means comprising image-forming structure arranged adjacent said opaque means for directly viewing the entire subject through said working opening, and means for displacing said viewing means laterally of the optical means to move said working opening across the path of light between the subject and the camera tube for projecting successive single images of the entire subject on the camera tube from correspondingly successive aspects.

11. Apparatus as defined in claim 10, in which the viewing means comprises a continuous opaque band having successive openings spaced along its length and each disposed and dimensioned to constitute said narrow working opening, said displacing means comprising means for continuously advancing said band along a path which crosses said optical means, for traversal of said light path by said openings in succession.

12. Apparatus as defined in claim 10, which includes means associated with the camera tube for controlling the same to produce picture signals representing a series of frames at a predetermined frequency, said displacing means comprising means effecting repeated movement of the working opening across the path of light, and means timing the repetition of said last-mentioned movement with the aforesaid frequency, so that the aforesaid frames of signals constitute a series of cycles each representing a sequence of aspect-pictures corresponding to a traversal of said working opening across the total aperture of the optical means.

13. Television camera apparatus comprising a television camera tube, optical means having a wide total aperture, for viewing a subject and for projecting an image thereof on said tube, said optical means including viewing means movable across the field of view of said optical means, said viewing means comprising opaque means blocking the passage of light through most of said total aperture but having a narrow working opening much smaller than said total aperture, said optical means comprising image-forming structure arranged adjacent said opaque means for directly viewing the entire subject through said working opening, and means for displacing said viewing means laterally of the optical means to move said working opening across the path of light between the subject and the camera tube for projecting successive images of the entire subject on the camera tube from correspondingly successive aspects; the aforesaid apparatus being further characterized as apparatus: in which the viewing means comprises a continuous opaque band having successive openings spaced along its length and each disposed and dimensioned to constitute said narrow working opening, said displacing means comprising means for continuously advancing said band along a path which crosses said optical means, for traversal of said light path by said openings in succession; and in which the optical means comprises a multiple-component lens assembly having said wide total aperture, and said displacing means is arranged to advance said band crosswise through said lens assembly approximately in the nodal plane thereof.

14. Apparatus as defined in claim 13, in which the optical means includes a screen arranged to receive a primary image formed by said lens assembly, and means including a supplemental lens for projecting on the camera tube a secondary image of said primary image, said secondary image constituting the aforesaid first-mentioned image, and last-mentioned means including reflecting means for conducting light from the screen to said supplemental lens.

15. Television camera apparatus comprising a television camera tube, optical means having a wide total aperture, for viewing a subject and for projecting an image thereof on said tube, said optical means including viewing means movable across the field of view of said optical means, said viewing means comprising opaque means blocking the passage of light through most of said total aperture but having a narrow working opening much smaller than said total aperture, said optical means comprising image-forming structure arranged adjacent said opaque means for directly viewing the entire subject through said working opening, and means for displacing said viewing means laterally of the optical means to move said working opening across the path of light between the subject and the camera tube for projecting successive images of the entire subject on the camera tube from correspondingly successive aspects; the aforesaid apparatus being further characterized as apparatus: in which the optical means includes a screen arranged to receive a primary image formed by said optical means, and means including a supplemental lens for projecting on the camera tube a secondary image of said primary image, said secondary image constituting the aforesaid first-mentioned image, and last-mentioned means including reflecting means for conducting light from the screen to said supplemental lens; and in which said screen has a curved concave face to provide a secondary image which is convertible into signals by the camera tube that will produce a substantially undistorted reproduction of the image when said signals are utilized to control the electron beam of a receiving picture tube with a plane phosphor surface.

16. In television picture tube apparatus, in combination, electron gun means for producing an electron beam and having means for modulating the beam in accordance with picture signals, a transparent screen having a phosphor coating arranged to be impinged by the beam from the gun, deflecting means for effecting scanning movement of the beam to provide a picture image on said coating, said transparent screen having an outer surface provided with vertical aspect-differentiating structure to produce a stereoscopic appearance of images on the phosphor coating, said aspect-differentiating structure providing a large number of vertical parallel components each for differentiating at least several vertical aspect elements, and grid means intermediate said phosphor coating and the electron gun means, including electron-deflecting elements aligned with the differentiating components, for deflecting the electron beam, successively adjacent each such element, into selected aspect localities in accordance with an applied electrical condition of said deflecting grid means, said grid means comprising a large number of pairs of said electron-deflecting elements, said pairs respectively corresponding to the differentiating components and the elements of each pair being spaced for passage of the beam between them and for deflection of the passing beam in accordance with the relative potential of the elements of the pair.

17. Apparatus as defined in claim 16, which includes associated signal receiving means for applying received picture signals, having a predetermined frame frequency, to the electron gun means and for controlling said first-mentioned deflecting means to establish images on the phosphor surface at said frequency, and which includes means for applying a cyclically varying potential to said grid means in timed relation to said frequency, said last-mentioned means including means establishing said potential to vary continuously in the same direction through a cycle having a duration equal to a multiplicity of frames, to cause the beam to establish images on the surface at successive selected aspect localities in a cyclic series to produce successive cycles each constituting a multiplicity of mutually different aspect-view sequences of said images for stereoscopic observation through the screen.

18. In television picture tube apparatus, in combination, electron gun means for producing an electron beam and having means for modulating the beam in accordance with picture signals, a transparent screen having a phosphor coating arranged to be impinged by the beam from the gun, deflecting means for effecting scanning movement of the beam to provide a picture image on said coating, said transparent screen having an outer surface provided with vertical aspect-differentiating structure to produce a stereoscopic appearance of images on the phosphor coating, said aspect-differentiating structure providing a multiplicity of vertical parallel components each for differentiating a multiplicity of vertical aspect elements, and grid means intermediate said phosphor coating and the electron gun means, including electron-deflecting elements aligned with the differentiating components, for deflecting the electron beam, successively adjacent each such element, into selected aspect localities in accordance with an applied electrical condition of said deflecting grid means; the aforesaid apparatus being further characterized as apparatus in which the grid means is a grid comprising a plate of insulating material having a multiplicity of fine vertical slots constituting said openings, each slot being defined by vertical side walls and having a metallic surface on each of the side walls, the metallic surfaces of said walls at one side of all the slots being connected together as one unit of the grid and the metallic surfaces of said walls at the other side of all the slots being connected together as the other unit of the grid, so that upon applying an electrical potential between said units, the electron beam is deflected in each slot in a direction and amount governed by such potential.

19. Apparatus as defined in claim 18, in which the screen comprises a transparent plate having a multiplicity of parallel, vertical lenticulations on its outer face, said phosphor surface being constituted on the inner face of said screen plate, said grid being spaced a small distance from said surface and having one slot for each lenticulation, in alignment therewith, and the walls of the slots being obliquely disposed relative to the faces of the grid plate so that each slot tapers to a wider opening at its face nearest the phosphor surface.

20. In a stereoscopic television system, in combination, a television camera tube, means for controlling said tube to produce picture signals therefrom at a predetermined frame frequency, optical means for viewing a subject and for projecting an image thereof on said tube, said optical means including viewing means movable across the field of view of said optical means, said viewing means having a working aperture much narrower than said field of view, and means timed with said controlling means, for displacing said viewing means repeatedly across the path of light between the subject and the camera tube to project successive images of the subject on the camera tube from correspondingly successive aspects, for producing successive cycles of signal frames from said tube each representing a sequence of said aspects, means for receiving signals transmitted from said camera tube, a receiving picture tube having electron beam producing means, an aspect-differentiating screen, and a phosphor surface optically associated with said screen, means controlled by the receiving means for modulating said electron beam and for scanning said surface with said beam, to provide picture images on said surface in accordance with received signals, said screen being constructed and arranged to differentiate sets of vertical aspect elements of said surface, for stereoscopic observation through the screen, electron-deflecting means near the phosphor surface for deflecting the electron beam to impinge on selected aspect elements thereof, and means under control of the receiving means and timed with said frame frequency, for applying an oscillating potential to said deflecting means to cause the beam to establish images selectively and successively at different sets of aspect elements to reproduce successive aspect view cycles each corresponding to a cycle of signal frames.

References Cited

UNITED STATES PATENTS

| | | | |
|---|---|---|---|
| 2,307,188 | 1/1943 | Bedford | 178—6.5 |
| 2,756,363 | 7/1956 | Wright | 178—6.5 |
| 2,831,998 | 4/1958 | Allen | 178—5.4 |
| 2,931,855 | 4/1960 | Abramson | 178—6.5 |
| 2,941,033 | 6/1960 | Fromm et al. | 178—7.11 |
| 2,967,906 | 1/1961 | Blake et al. | 178—7.11 |
| 3,046,330 | 7/1962 | Ross | 178—6.5 |

FOREIGN PATENTS 1,066,418   10/1959   Germany.

JOHN W. CALDWELL, *Acting Primary Examiner.*

J. A. ORSINO, *Assistant Examiner.*

UNITED STATES PATENT OFFICE
CERTIFICATE OF CORRECTION

Patent No. 3,334,179                                              August 1, 1967

Douglas F. Winnek

It is hereby certified that error appears in the above numbered patent requiring correction and that the said Letters Patent should read as corrected below.

Column 4, line 6, "of", second occurrence, should read -- or --. Column 6, line 44, "X" should read -- Z --. Column 7, lines 9 and 10, "proect" should read -- project --; line 56, "shutters" should read -- shutter --. Column 8, line 48, "layers" should read -- layer --. Column 9, line 13, "silt" should read -- slit --; line 67, "images" should read -- image -- line 70, "post-deflectjon" should read -- post-deflection --. Column 10, line 56, "toward", first occurrence, should read -- from --. Column 14, line 67, "17" should read -- 7 --. Column 17, line 23, "screen" should read -- screens --; line 59, "cermic" should read -- ceramic --. Column 19, line 75, "television" should read -- televising --. Column 20, line 48, "decsription" should read -- description --.

Signed and sealed this 19th day of August 1969.

(SEAL)
Attest:

EDWARD M. FLETCHER, JR.                               WILLIAM E. SCHUYLER, JR.
Attesting Officer                                            Commissioner of Patents